United States Patent
Ishizaka et al.

(10) Patent No.: US 12,412,374 B2
(45) Date of Patent: Sep. 9, 2025

(54) DATA AUGMENTATION METHOD, LEARNING DEVICE, AND RECORDING MEDIUM

(71) Applicant: Panasonic Intellectual Property Corporation of America, Torrance, CA (US)

(72) Inventors: Shun Ishizaka, Tokyo (JP); Kazuki Kozuka, Osaka (JP); Sotaro Tsukizawa, Osaka (JP); Denis Gudovskiy, San Ramon, CA (US)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 336 days.

(21) Appl. No.: 18/141,603

(22) Filed: May 1, 2023

(65) Prior Publication Data
US 2023/0267713 A1 Aug. 24, 2023

Related U.S. Application Data

(63) Continuation of application No. PCT/JP2021/040736, filed on Nov. 5, 2021.
(Continued)

(51) Int. Cl.
*G06V 10/774* (2022.01)
*G06V 10/776* (2022.01)
*G06V 10/82* (2022.01)

(52) U.S. Cl.
CPC .......... *G06V 10/774* (2022.01); *G06V 10/776* (2022.01); *G06V 10/82* (2022.01)

(58) Field of Classification Search
CPC ...... G06N 3/0464; G06N 3/09; G06N 3/0985; G06V 10/774; G06V 10/7753;
(Continued)

(56) References Cited

U.S. PATENT DOCUMENTS 11,205,099 B2* 12/2021 Shlens .................... G06N 20/00
11,232,328 B2* 1/2022 Mounsaveng ......... G06N 3/045
(Continued)

OTHER PUBLICATIONS

Ekin D. Cubuk et al., "AutoAugment: Learning Augmentation Strategies From Data," Jun. 2019, Proceedings of the IEEE/CVF Conference on Computer Vision and Pattern Recognition (CVPR), 2019, pp. 113-120.*
(Continued)

*Primary Examiner* — Omar S Ismail
(74) *Attorney, Agent, or Firm* — Wenderoth, Lind & Ponack, L.L.P.

(57) ABSTRACT

First optimization processing for optimizing parameters of a DNN and second optimization processing for optimizing hyperparameters for each sample used in data augmentation processing are alternately performed. The first optimization processing includes causing the DNN to predict a first augmentation label from a first augmented sample, calculating a first error function between the first augmentation label and a first correct label for a first sample, and updating the parameters in accordance with the first error function. The second optimization processing includes acquiring a second sample, causing the DNN after the updating of the parameters to predict a second label from the second sample, calculating a second error function between the second label and a second correct label for the second sample, and updating the hyperparameter in accordance with a gradient obtained by differentiation of the second error function with respect to the hyperparameter.

7 Claims, 18 Drawing Sheets

Related U.S. Application Data

(60) Provisional application No. 63/110,570, filed on Nov. 6, 2020.

(58) Field of Classification Search
CPC .. G06V 10/776; G06V 10/82; G06F 18/2155; G06F 18/2185
See application file for complete search history.

(56) References Cited

U.S. PATENT DOCUMENTS

| | | | | |
|---|---|---|---|---|
| 11,301,733 | B2* | 4/2022 | Shlens | G06T 11/001 |
| 11,610,098 | B2* | 3/2023 | Dong | G06N 20/00 |
| 2019/0205748 | A1* | 7/2019 | Fukuda | G06N 3/044 |
| 2020/0103244 | A1* | 4/2020 | Cella | G05D 1/0212 |
| 2020/0104966 | A1* | 4/2020 | Cella | B60W 40/08 |
| 2020/0372608 | A1* | 11/2020 | Lee | G06T 3/4053 |
| 2020/0379454 | A1* | 12/2020 | Trinh | G05B 23/024 |
| 2021/0073995 | A1* | 3/2021 | Yang | G06T 5/70 |

OTHER PUBLICATIONS

Connor Shorten et al., "A survey on Image Data Augmentation for Deep Learning," Jul. 6, 2019, Shorten and Khoshgoftaar J Big Data (2019) 6:60, pp. 1-34.*

Antreas Antoniou et al., "Data Augmentation Generative Adversarial Networks," Mar. 21, 2018, arXiv: 1711.04340v3, pp. 1-9.*

Sungbin Lim et al., "Fast AutoAugment," Dec. 8, 2019, 33rd Conference on Neural Information Processing Systems (NeurIPS 2019), Article No. 598, pp. 1-9.*

Chen Lin et al., "Online Hyper-parameter Learning for Auto-Augmentation Strategy," Oct. 2019, Proceedings of the IEEE/CVF International Conference on Computer Vision (ICCV), 2019, pp. 6579-6586.*

Ryuichiro Hataya et al. ,"Meta Approach to Data Augmentation Optimization," Jun. 14, 2020, arXiv:2006.07965v1, pp. 1-8.*

International Search Report issued Jan. 25, 2022 in International (PCT) Application No. PCT/JP2021/040736.

Cubuk, Ekin D. et al., "AutoAugment: Learning Augmentation Strategies from Data", arXiv:1805.09501v3 [cs.CV], Apr. 2019.

Lim, Sungbin et al., "Fast AutoAugment", arXiv:1905.00397v2 [cs.LG], May 2019.

Hataya, Ryuichiro et al., "Meta Approach to Data Augmentation Optimization", arXiv:2006.07965v1 [cs.CV], Jun. 2020.

Extended European Search Report issued Feb. 27, 2024 in corresponding European Patent Application No. 21889261.0.

Chen Lin et al., "Online Hyper-parameter Learning for Auto-Augmentation Strategy", 2019 IEEE/CVF International Conference on Computer Vision (ICCV) (Oct. 27, 2019), pp. 6578-6587.

* cited by examiner

| Algorithm 1 optimization of $f(\theta), g(\lambda)$ |
|---|
| 1: Initialize parameters $\theta$ and hyperparameters $\lambda$ |
| 2: for epoch = 1...epochs do |
| 3:     for batch = 1...batches do |
| 4:         sample batch $\{(x,y)\}_{bi \in B}$ from $D_{train}$ |
| 5:         augment data $x^A = g_A(x, \lambda^A)$ |
| 6:         predict $\hat{y} = f(x^A, \theta)$ |
| 7:         generate soft-labels $y^s = g_S(y, \lambda^S)$ |
| 8:         calculate $\nabla_\theta (wL(y^s, \hat{y}))$ |
| 9:         update $\theta$ using task optimizer |
| 10:    if epoch > E then |
| 11:        for batch = 1...batches do |
| 12:            sample $\{(x,y)\}_{bi \in B}$ from $D_{train}$ |
| 13:            sample $\{(x^v, y^v)_{bj \in B}$ from $D_{val}$ |
| 14:            predict $\hat{y}^v = f(x^v, \theta)$ |
| 15:            predict $\hat{y} = f(x^A, \theta) = f(g_A(x, \lambda^A), \theta)$ |
| 16:            generate soft-labels $y^s = g_S(y, \lambda^S)$ |
| 17:            calculate $\nabla_\lambda L_v$ using, where |
| 18:            $L = wL(y^s, \hat{y})$ and $L_v = L_v(y^v, \hat{y}^v)$ |
| 19:            update $\lambda$ using HO optimizer |

FIG. 15

| Alg./IR-NR | 1-0.0 | 100-0.0 | 1-0.1 | 100-0.1 |
| --- | --- | --- | --- | --- |
| Baseline | 3.6±0.10 | 13.6±0.69 | 5.3±0.27 | 20.0±1.92 |
| FAA | 2.8±0.02 | 11.5±0.32 | 3.7±0.08 | 15.3±1.07 |
| $\lambda^{A_{SHA}}$(ours) | 2.8±0.10 | 12.6±1.53 | 3.0±0.17 | 13.7±0.77 |
| $\lambda^{A}$(ours) | 2.7±0.09 | 10.2±0.50 | 3.0±0.07 | 12.3±0.80 |
| $\lambda^{A,w}$(ours) | 2.8±0.04 | 6.1±0.22 | 2.8±0.07 | 8.1±0.14 |
| $\lambda^{A,w,s}$(ours) | 2.5±0.04 | 5.3±0.21 | 2.6±0.05 | 6.3±0.57 |

DATA AUGMENTATION METHOD, LEARNING DEVICE, AND RECORDING MEDIUM

CROSS REFERENCE TO RELATED APPLICATIONS

This is a continuation application of PCT International Application No. PCT/JP2021/040736 filed on Nov. 5, 2021, designating the United States of America, which is based on and claims priority of U.S. Provisional Patent Application No. 63/110,570 filed on Nov. 6, 2020. The entire disclosures of the above-identified applications, including the specifications, drawings and claims are incorporated herein by reference in their entirety.

FIELD

The present disclosure relates to a data augmentation method for training data sets used in training of a neural network, a learning device, and a recording medium.

BACKGROUND

In the development of systems that apply image recognition, it is necessary to collect a large amount of training image data in order to acquire a high-precision AI model.

Samples such as image data of general objects such as people are easy to collect on a large scale, whereas samples of non-general objects such as strollers are difficult to collect on a large scale. Samples of objects that exist in small amounts, such as specific products or abnormal samples, are also difficult to collect on a large scale.

One technology that can help increase the number of training samples even when there is a limited amount of existing training data is augmentation. Data augmentation is a technique for padding the number of samples by performing conversion processing on training samples such as image data, and various types of data augmentation techniques have been proposed (e.g., Non-Patent Literature (NPL) 1).

NPL 1 discloses a technique for augmenting data by filling in part of images with different values.

CITATION LIST

Non Patent Literature

NPL 1: Ekin D Cubuk, Barret Zoph, Dandelion Mane, Vijay Vasudevan, and Quoc V Le. AutoAugment: Learning augmentation policies from data. arXiv: 1805.09501, 2018.

NPL 2: Sungbin Lim, Ildoo Kim, Taesup Kim, Chiheon Kim, and Sungwoong Kim, Fast AutoAugment. In Advances in Neural Information Processing Systems, 2019.

SUMMARY

Technical Problem

However, although it is possible with the technique disclosed in NPL 1 to increase the number of training samples, in some cases it is not possible to acquire a high-precision AI model. In other words, there are cases in which, if conversion processing is not performed properly on training samples, a decision plane (decision line) that is generated by learning may deviate considerably from an ideal boundary line. This may result in not only failing to contribute to an improvement in predictability but also lowering predictability.

The present disclosure has been made in light of circumstances described above, and it is an object of the present disclosure to provide a data augmentation method or the like capable of increasing the number of samples for training data sets in order to acquire a high-precision AI model.

Solution to Problem

To solve the problems described above, a data augmentation method according to one aspect of the present disclosure is a data augmentation method for a training data set used in training of a neural network. The data augmentation method includes alternately performing first optimization processing and second optimization processing, the first optimization processing being processing for optimizing a plurality of parameters of the neural network, the plurality of parameters including a weight, the second optimization processing being processing for optimizing a hyperparameter serving as a variable that prescribes data conversion processing for each sample used in data augmentation processing. The first optimization processing includes acquiring a first augmented sample by performing the data augmentation processing on a first sample included in the training data set, causing the neural network to predict a first augmentation label from the first augmented sample, calculating a first error function for evaluating an error between the first augmentation label and a first correct label that indicates a correct answer to the first sample included in the training data set, and updating the plurality of parameters in accordance with the first error function calculated. The second optimization processing includes acquiring a second sample from an evaluation data set that is similar in distribution to a test data set for evaluating performance of the neural network, causing the neural network after the updating of the plurality of parameters to predict a second label from the second sample, calculating a second error function for evaluating an error between the second label and a second correct label that indicates a correct answer to the second sample included in the evaluation data set, and updating the hyperparameter in accordance with a gradient obtained by partial differentiation of the second error function calculated, with respect to the hyperparameter.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Advantageous Effects

The data augmentation method or the like according to the present disclosure is capable of increasing the number of samples for training data sets in order to acquire a high-precision AI model.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7A shows one example of an evaluation data set according to Example 1,

FIG. 7B shows one example of a training data set according to Example 1.

FIG. 9 illustrates pseudocode of algorithm 1 showing one example of an optimization processing procedure for alternately performing the first optimization processing and the second optimization processing according to Example 1.

FIG. 15 shows a result of verification obtained by evaluating an error rate for the test data set after learning using training data sets according to an example.

DESCRIPTION OF EMBODIMENTS

Figure 1:
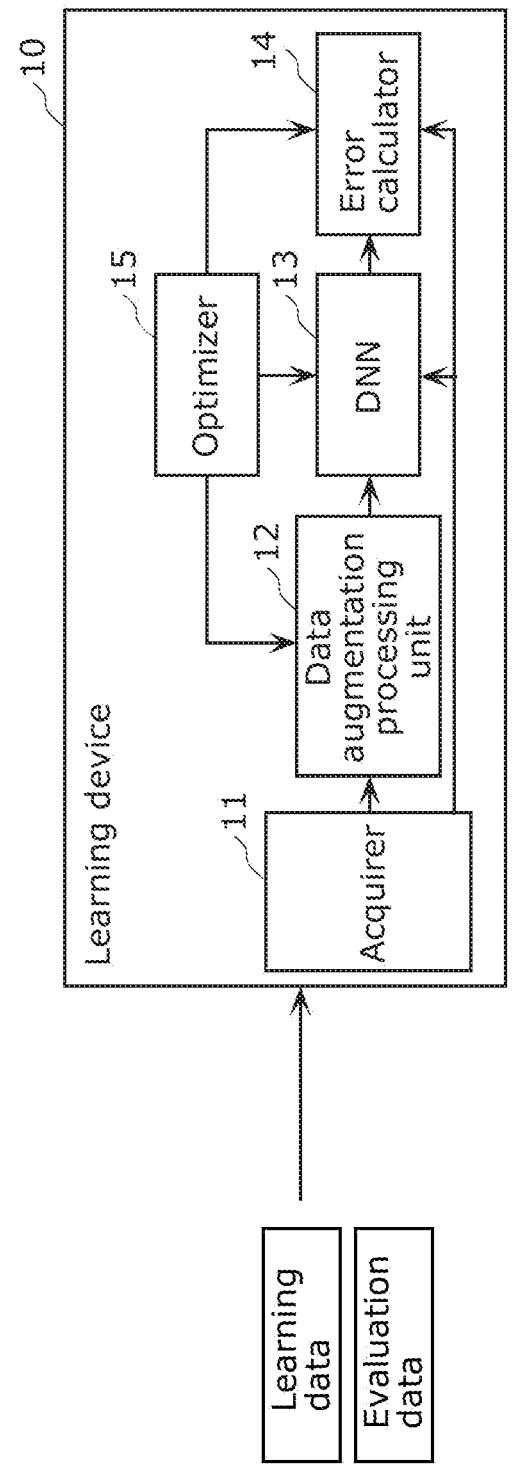
FIG. 1 is a block diagram showing one example of a configuration of a learning device according to an embodiment.

A data augmentation method according to one aspect of the present disclosure is a data augmentation method for a training data set used in training of a neural network. The data augmentation method includes alternately performing first optimization processing and second optimization processing, the first optimization processing being processing for optimizing a plurality of parameters of the neural network, the plurality of parameters including a weight, the second optimization processing being processing for optimizing a hyperparameter serving as a variable that prescribes data conversion processing for each sample used in data augmentation processing. The first optimization processing includes acquiring a first augmented sample by performing the data augmentation processing on a first sample included in the training data set, causing the neural network to predict a first augmentation label from the first augmented sample, calculating a first error function for evaluating an error between the first augmentation label and a first correct label that indicates a correct answer to the first sample included in the training data set, and updating the plurality of parameters in accordance with the first error function calculated. The second optimization processing includes acquiring a second sample from an evaluation data set that is similar in distribution to a test data set for evaluating performance of the neural network, causing the neural network after the updating of the plurality of parameters to predict a second label from the second sample, calculating a second error function for evaluating an error between the second label and a second correct label that indicates a correct answer to the second sample included in the evaluation data set, and updating the hyperparameter in accordance with a gradient obtained by partial differentiation of the second error function calculated, with respect to the hyperparameter.

Since this method is capable of optimizing the hyperparameter, it is possible to increase the number of samples for the training data set in order to acquire a high-precision AI model.

More specifically, in the process of training of the neural network for optimizing the parameters of the neural network, the difference between the distribution of the test data set and the distribution of the data-augmented training data set can be minimized by using the gradient obtained by partial differentiation of the hyperparameter for each sample. Accordingly, even if the data-augmented training data obtained by the data augmentation processing is used in the training of the neural network, it is possible to increase the number of samples for the training data set so as to bring the decision plane that is generated by learning closer to the ideal decision plane. In this way, it is possible to increase the number of samples for the training data set in order to acquire a high-precision AI model.

Moreover, for each sample, the parameters of the neural network and the hyperparameter of the data augmentation processing are alternately optimized. Thus, the optimization of the hyperparameter for each sample can be performed together with the training of the parameters of the neural network. Accordingly, it is possible to reduce the calculation cost required to optimize the parameters of the neural network and to optimize the hyperparameter for each sample.

For example, in the updating of the hyperparameter, the hyperparameter may be updated in accordance with the gradient to reduce a difference in distribution between distribution of the evaluation data set and distribution of a data-augmented training data set obtained by performing the data augmentation processing on the training data set.

Thus, the hyperparameter can be updated so as to minimize a difference between the distribution of the test data set and the distribution of the data-augmented training data set. Accordingly, even if the data-augmented training data obtained by the data augmentation processing is used in the training of the neural network, it is possible to bring the decision plane that is generated by learning closer to the ideal decision plane.

For example, the hyperparameter may be converted into an implicit function in a function indicating the data augmentation processing, and the neural network may be an exact differentiable function.

The use of implicit differentiation allows the calculation of partial differentiation of the hyperparameter.

For example, in the calculating of the first error function, the first error function may be calculated to evaluate an error between the first augmentation label and a first correct soft label, using Kullback-Leibler divergence, the first correct soft label being obtained by converting a correct value indicated by the first correct label into a soft label.

This reduces noise in the correct label relative to the sample, the noise being included after data augmentation. Accordingly, it is possible to optimize the hyperparameter for each sample so as to minimize a difference between the distribution of the test data set and the distribution of the data-augmented training data set by using the gradient obtained by partial differentiation of the hyperparameter for each sample.

For example, the calculating of the first error function may further include assigning a weight calculated for each sample to the first error function.

This enables capturing and reducing a bias to the sample. Accordingly, it is possible to optimize the hyperparameter for each sample so as to minimize a difference between the distribution of the test data set and the distribution of the data-augmented training data set by using the gradient obtained by partial differentiation of the hyperparameter for each sample.

A learning device according to one aspect of the present disclosure is a learning device for performing a data augmentation method for a training data set used in training of a neural network. The learning device includes a processor and a memory. The processor uses the memory to alternately perform first optimization processing and second optimization processing, the first optimization processing being processing for optimizing a plurality of parameters of the neural network, the plurality of parameters including a weight, the second optimization processing being processing for optimizing a hyperparameter serving as a variable that prescribes data conversion processing for each sample used in data augmentation processing. The first optimization processing includes acquiring a first augmented sample by performing the data augmentation processing on a first sample included in the training data, causing the neural network to predict a first augmentation label from the first augmented sample, calculating a first error function for evaluating an error between the first augmentation label and a first correct label that indicates a correct answer to the first sample included in the training data set, and updating the plurality of parameters in accordance with the first error function calculated. The second optimization processing includes acquiring a second sample from an evaluation data set that is similar in distribution to a test data set for evaluating performance of the neural network, causing the neural network after the updating of the plurality of parameters to predict a second label from the second sample, calculating a second error function for evaluating an error between the second label and a second correct label that indicates a correct answer to the second sample included in the evaluation data set, and updating the hyperparameter in accordance with a gradient obtained by partial differentiation of the second error function calculated, with respect to the hyperparameter.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The embodiment described below shows one specific example of the present disclosure. Numerical values, shapes, constituent elements, steps, the order of steps and so on described in the following embodiment are mere examples and do not intend to limit the present disclosure. Among the constituent elements according to the embodiment described below, those that are not recited in any independent claim, which represents the broadest concept of the present disclosure, are described as optional constituent elements. Moreover, contents described in every embodiment may be combined in any way.

Embodiment

Hereinafter, an information processing method or the like for learning device 10 according to an embodiment will be described with reference to the drawings.

1.1 Configuration of Learning Device 10

FIG. 1 is a block diagram showing one example of a configuration of learning device 10 according to an embodiment. Learning device 10 is a device for performing training of a neural network and also executing a data augmentation method for training data sets used in the training of the neural network. Learning device 10 alternately performs first optimization processing and second optimization processing, the first optimization processing being processing for optimizing a plurality of parameters of the neural network, the parameters including a weight, the second optimization processing being processing for optimizing a hyperparameter serving as a variable that prescribes data conversion processing for each sample used in data augmentation processing.

In the present embodiment, learning device 10 includes acquirer 11, data augmentation processing unit 12, DNN 13, error calculator 14, and optimizer 15 as illustrated in FIG. 1.

1.1.1 Acquirer 11

In the first optimization processing, acquirer 11 acquires a first sample from a training data set and inputs the first sample to data augmentation processing unit 12. The training data set as used herein may include, for example, a plurality of samples such as image data and correct labels assigned to each sample. Note that the samples are not limited to image data.

In the first optimization processing, acquirer 11 also acquires a first correct label that indicates a correct answer to the first sample from the training data set and inputs the first correct label to error calculator 14.

In the second optimization processing, acquirer 11 acquires a second sample from an evaluation data set and inputs the second sample to DNN 13. The evaluation data set as used herein refers to a data set of distribution that is similar to the distribution of a test data set for evaluating the performance of trained DNN 13. Note that the evaluation data set is different from the test data set. The evaluation data set may be generated by dividing a test data set for existing data sets.

In the second optimization processing, acquirer 11 also acquires a second correct label that indicates a correct answer to the second sample from the evaluation data set and inputs the second correct label to error calculator 14.

In the second optimization processing, acquirer 11 may further acquire a third sample from the training data set and input the third sample to data augmentation processing unit 12. In this case, acquirer 11 may acquire a third correct label that indicates a correct answer to the third sample from the training data set and input the third correct label to error calculator 14. The third sample may be different from the first sample, or may be the same as the first sample.

1.1, 2 Data Augmentation Processing Unit 12

In the first optimization processing, data augmentation processing unit 12 performs data augmentation processing on the first sample included in the training data set and outputs a first augmented sample. More specifically, in the first optimization processing, data augmentation processing unit 12 uses a hyperparameter serving as a variable that prescribes data conversion processing for each sample to perform the data augmentation processing on the first sample. The hyperparameter may, for example, be a variable that prescribes data conversion processing such as rotation, zooming, translation, or color conversion and may be prescribed for each sample.

In the present embodiment, data augmentation processing unit 12 performs the data augmentation processing by exerting a function that indicates the data augmentation processing on the samples acquired from the training data set. The hyperparameter as used herein is converted into an implicit function in the function indicating the data augmentation processing.

Here, g is the function indicating the data augmentation processing, and $\lambda_1$ is the hyperparameter for the first sample. In this case, by exerting $g(\lambda_1)$ on the first sample in the first optimization processing, data augmentation processing unit 12 is capable of performing the data augmentation processing on the first sample and outputting the first augmented sample. Accordingly, in the first optimization processing, when $\lambda_i$ is the hyperparameter for the i-th sample (i is a natural number), data augmentation processing unit 12 is capable of performing the data augmentation processing on the i-th sample by exerting $g(\lambda_i)$ on the i-th sample.

In the case where the third sample is input from acquirer 11 in the second optimization processing, data augmentation processing unit 12 may perform the data augmentation processing on the third sample and output a third augmented sample. In this case, by exerting $g(\lambda_3)$ on the third sample in the second optimization processing where $\lambda_3$ is the hyperparameter for the third sample, data augmentation processing unit 12 is capable of performing the data augmentation processing on the third sample and outputting the third augmented sample.

1.1.3 DNN 13

DNN 13 is configured by a neural network having a plurality of parameters such as a CNN. In the first optimization processing, DNN 13 predicts a first augmentation label from the first augmented sample, which is input from acquirer 11. One example of the parameters is a weight, but the parameters are not limited to the weight.

In the first optimization processing according to the present embodiment, DNN 13 exerts a function that indicates prediction processing performed by the neural network, on the first augmented sample so as to perform prediction processing for predicting the first augmentation label that indicates a correct answer to the first augmented sample. Here, the function indicating the prediction processing performed by the neural network is an exact differentiable function. The parameters are converted into implicit functions in the function indicating the prediction processing performed by the neural network.

Here, f is the function indicating the prediction processing performed by the neural network, and θ indicates a plurality of parameters including a weight. In the first optimization processing, DNN 13 is capable of predicting the first augmentation label by exerting f(θ) on the first augmented sample.

After the parameters are updated in the first optimization processing, DNN 13 predicts a second label from the second sample that is input from acquirer 11 and included in the evaluation data set. In other words, in the second optimization processing according to the present embodiment, DNN 13 predicts the second label by exerting f(θ) whose parameters are updated by the first optimization processing on the second sample.

In the case where the third augmented sample is input to data augmentation processing unit 12 in the second optimization processing, DNN 13 may predict a third augmentation label that indicates a correct answer to the third augmented sample from the third augmented sample.

1.1.4 Error Calculator 14

In the first optimization processing, error calculator 14 calculates a first error function for evaluating an error between the first augmentation label and the first correct label that indicates a correct answer to the first sample included in the training data set. A first error function as used herein is a loss function called the Kullback-Leibler divergence (KL divergence). The first error function may also be a cross-entropy error function.

Note that the KL divergence can be used as a yardstick to measure a difference between two probability distributions in a probability theory and an information theory. That is, the KL divergence is a loss function that enables evaluating the degree of similarly between a probability distribution as a correct distribution and a probability distribution as an estimated distribution.

Alternatively, in the first optimization processing, error calculator 14 may calculate a first error function for, using the KL divergence, evaluating an error between the first augmentation label and a first correct soft label that is obtained by converting the correct value indicated by the first correct label into a soft label. The soft label as used herein means that the degree of similarity between the first augmented sample and the correct label is expressed not by a discrete value (hard label) but by a ratio. For example, Gumbel-Softmax or Softmax may be used as the soft label. In this case, it is possible to reduce noise in the correct label for the sample, the noise being included after the data augmentation.

In the first optimization processing, error calculator 14 may further assign a weight calculated for each sample to the calculated first error function.

In the second optimization processing, error calculator 14 calculates a second error function for evaluating an error between the second label and a second correct label that indicates a correct answer to the second sample included in the evaluation data set. Like the first error function, the second error function as used herein may be a loss function called the KL divergence, or may be a cross-entropy error function.

In the case where DNN 13 predicts the third augmentation label from the third augmented sample in the second optimization processing, error calculator 14 may use the first error function to evaluate an error between the third augmentation label and the third correct label that indicates a correct answer to the third sample included in the training data set.

1.1.5 Optimizer 15

In the first optimization processing, optimizer 15 updates the parameters in accordance with the first error function calculated by error calculator 14. This allows optimizer 15 to perform first optimization processing for optimizing the parameters of the neural network.

In the second optimization processing, optimizer 15 updates the hyperparameter in accordance with a gradient that is obtained by partial differentiation of the second error function calculated by error calculator 14 with respect to the hyperparameter. Since the hyperparameter is converted into an implicit function, the use of implicit differentiation enables calculating partial differential with respect to the hyperparameter. Here, optimizer 15 updates the hyperparameter in accordance with the gradient so as to reduce a difference between the distribution of the evaluation data set and the distribution of the data-augmented training data set obtained by performing the data augmentation processing on the training data set. Accordingly, in the second optimization processing, optimizer 15 is capable of optimizing the hyperparameter serving as a variable that prescribes the data conversion processing for each sample used in the data augmentation processing.

Learning device 10 configured as described above alternately performs the first optimization processing and the second optimization processing, the first optimization processing being processing performed on the parameters of the neural network, the second optimization processing being processing performs on the hyperparameter for each sample used in the data augmentation processing. Accordingly, it is possible to match the distribution of the training data set obtained by the data augmentation processing to the distribution of the test data set and thereby to increase the number of samples included in the training data set in order to acquire a high-precision AI model.

More specifically, the number of samples included in the test data set can be increased such that the decision plane that is generated by learning becomes close to an ideal decision plane even if the neural network is trained using training data that has an increased number of samples having undergone the data authentication processing as described above. In this way, it is possible to increase the number of samples included in the training data set in order to acquire a high-precision AI model.

1.2 Hardware Configuration of Learning Device 10

Figure 2:
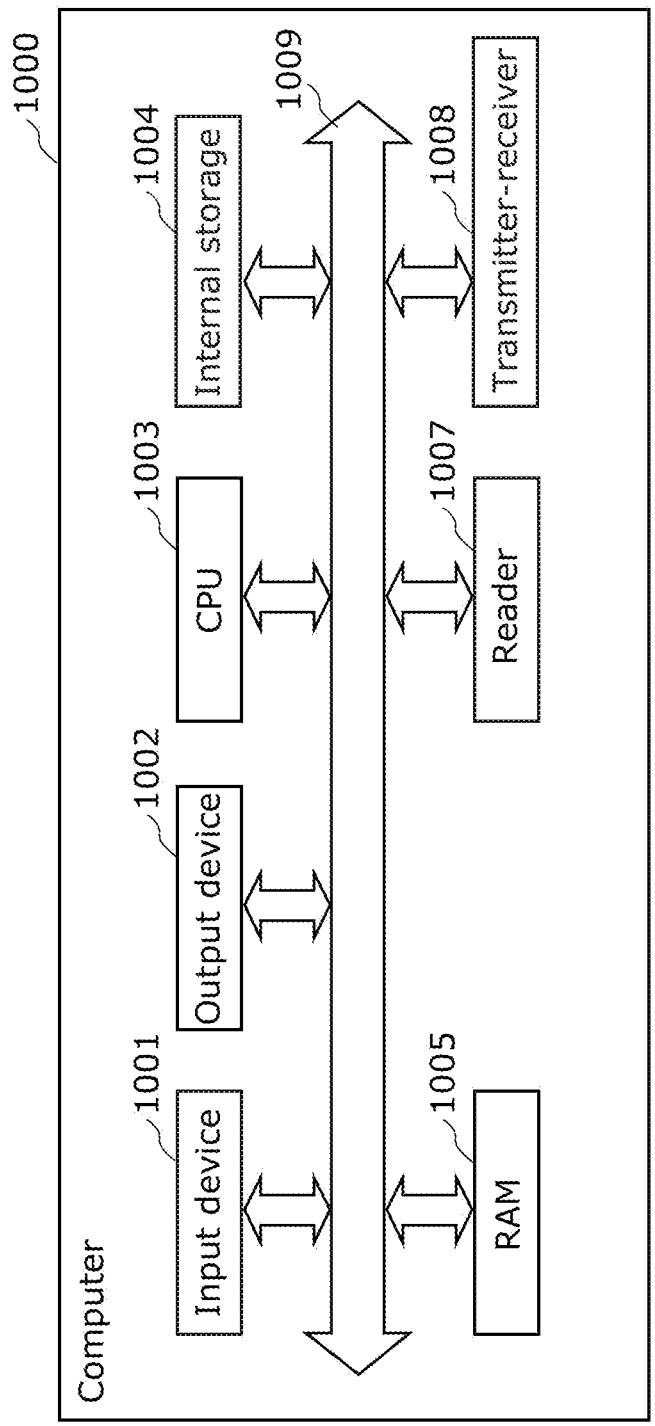
FIG. 2 shows one example of a hardware configuration of a computer that implements the functions of the learning device according to the embodiment via software.

FIG. 2 shows one example of a hardware configuration of computer 1000 that implements the functions of learning device 10 according to the embodiment via software.

As illustrated in FIG. 2, computer 1000 includes input device 1001, output device 1002, CPU 1003, internal storage 1004, RAM 1005, reader 1007, transmitter-receiver 1008, and bus 1009. Input device 1001, output device 1002, CPU 1003, internal storage 1004, RAM 1005, reader 1007, and transmitter-receiver 1008 are connected by bus 1009.

Input device 1001 is a device serving as a user interface such as an input button, a touch pad, or a touch panel display and accepts operations from a user. Note that input device 1001 may be configured not only to accept contact operations from a user but also to accept other operations including audio operations and remote operations via a remote controller or the like.

Output device 1002 is used together with input device 1001 and configured as, for example, a touch pad or a touch panel display to notify a user of information to be known by the user.

Internal storage 1004 may, for example, be a flash memory. Internal storage 1004 may store in advance data such as programs for implementing the functions of learning device 10, a neural network with a plurality of parameters, function f that indicates prediction processing performed by the neural network, and function g that indicates data augmentation processing.

RAM 1005 is a random access memory and used to store data or any other information at the time of execution of a program or an application.

Reader 1007 reads information from a recording medium such as a universal serial bus (USB) memory. Reader 1007 reads programs or applications from a recording medium that records thereon the programs or the applications as described above, and stores the programs or the applications in internal storage 1004.

Transmitter-receiver 1008 is a communication circuit for wireless or wired communication. For example, transmitter-receiver 1008 may communicate with a server device or a cloud connected to the network, download a program or an application as described above from the server device or the cloud, and store the downloaded program or application in internal storage 1004.

CPU 1003 is a central processing unit that copies programs or applications stored in internal storage 1004 to RAM 1005 and sequentially reads out and executes commands included in the programs or the applications from RAM 1005. Note that the programs or the applications may be directly read out and executed from internal storage 1004.

1.3 Operations of Learning Device 10

The following description is given of operations of learning device 10 configured as described above.

Figure 3:
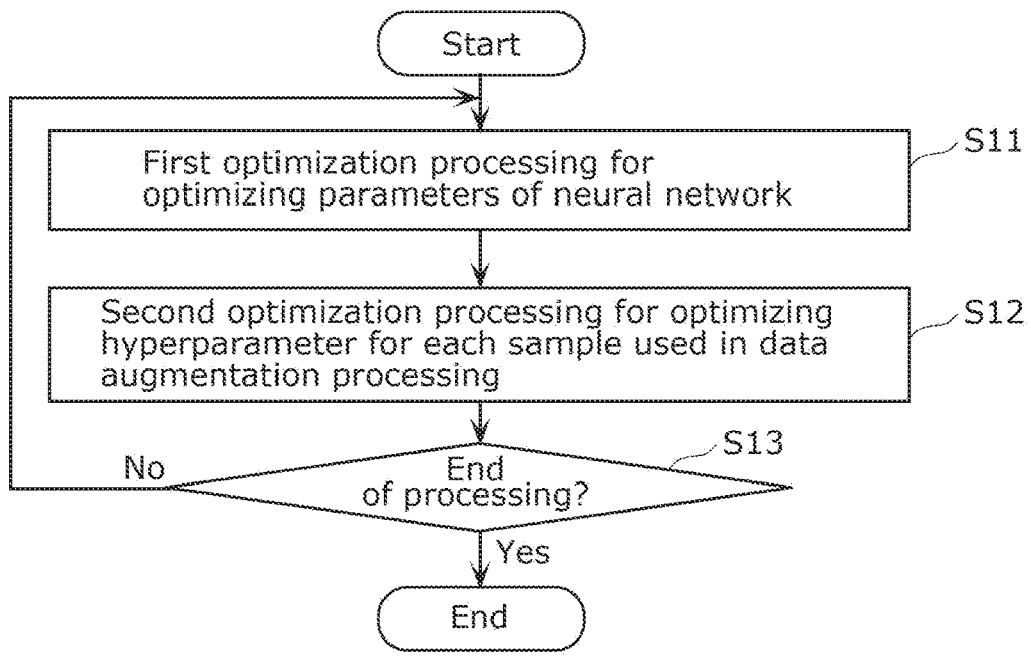
FIG. 3 is a flowchart illustrating an overview of operations of the learning device according to the embodiment.

FIG. 3 is a flowchart illustrating an overview of operations of learning device 10 according to the embodiment.

First, learning device 10 performs the first optimization processing for optimizing a plurality of parameters of the neural network (S11). Then, learning device 10 performs the second optimization processing for optimizing the hyperparameter for each sample used in the data augmentation processing (S12). Then, learning device 10 determines whether or not to end the processing (S13). For example, when the first optimization processing and the second optimization processing have been performed a prescribed number of times (epochs), learning device 10 determines to end the processing (Yes in step S13) and ends the operations. On the other hand, for example, when the first optimization processing and the second optimization processing have not yet been performed a prescribed number of times (epochs), learning device 10 determines not to end the processing (No in step S13) and repeats the processing from step S11.

Figure 4:
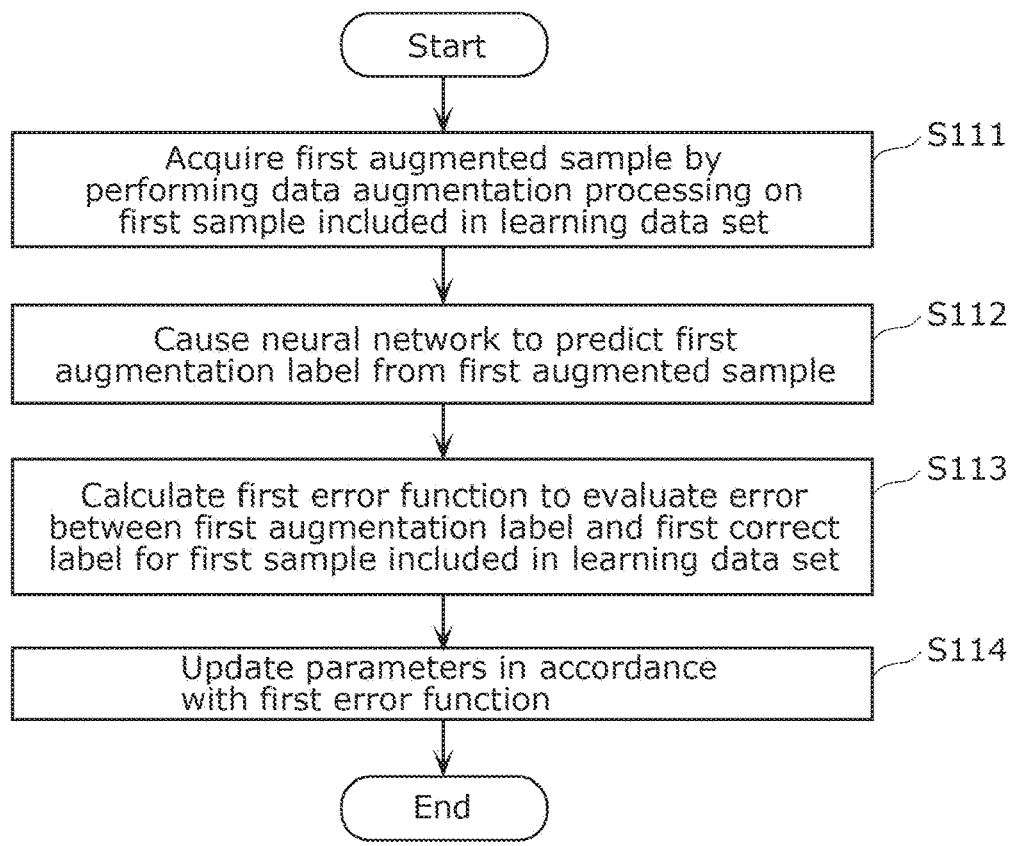
FIG. 4 is a flowchart illustrating detailed operations performed in first optimization processing illustrated in FIG. 3.

FIG. 4 is a flowchart illustrating detailed operations performed in the first optimization processing illustrated in FIG. 3.

In the first optimization processing, first, learning device 10 performs data augmentation processing on the first sample included in the training data set to acquire a first augmented sample (S111). Here, learning device 10 uses a hyperparameter serving as a variable that prescribes data conversion processing for each sample to perform the data augmentation processing on the first sample. For example, when g is the function indicating the data augmentation processing and $\lambda_1$ is the hyperparameter for the first sample, learning device 10 exerts $g(\lambda_1)$ on the first sample so as to acquire the first augmented sample obtained by performing the data augmentation processing on the first sample.

Next, learning device 10 causes the neural network to predict the first augmentation label from the first augmented sample acquired in step S111 (S112). For example, when f is the function indicating prediction processing performed by the neural network and $\theta$ indicates a plurality of parameters including a weight, learning device 10 exerts $f(\theta)$ on the first augmented sample so as to cause the neural network to predict the first augmentation label.

Next, learning device 10 calculates a first error function for evaluating an error between the first augmentation label predicted in step S112 and the first correct label for the first sample included in the training data set (S113). Here, the first error function may, for example, be a loss function called the KL divergence. As described above, learning device 10 may calculate a first error function for, using the KL divergence, evaluating an error between the first augmentation label and a first correct soft label obtained by converting the correct value indicated by the first correct label into a soft label. Learning device 10 may further assign a weight calculated for each sample to the calculated first error function.

Next, learning device 10 updates the parameters in accordance with the first error function calculated in step S113 (S114).

In this way, learning device 10 is capable of performing the first optimization processing for optimizing the parameters of the neural network, such as a weight, using the training data set obtained by padding the number of samples in the data augmentation processing performed in the initial state or after the second optimization processing.

Figure 5:
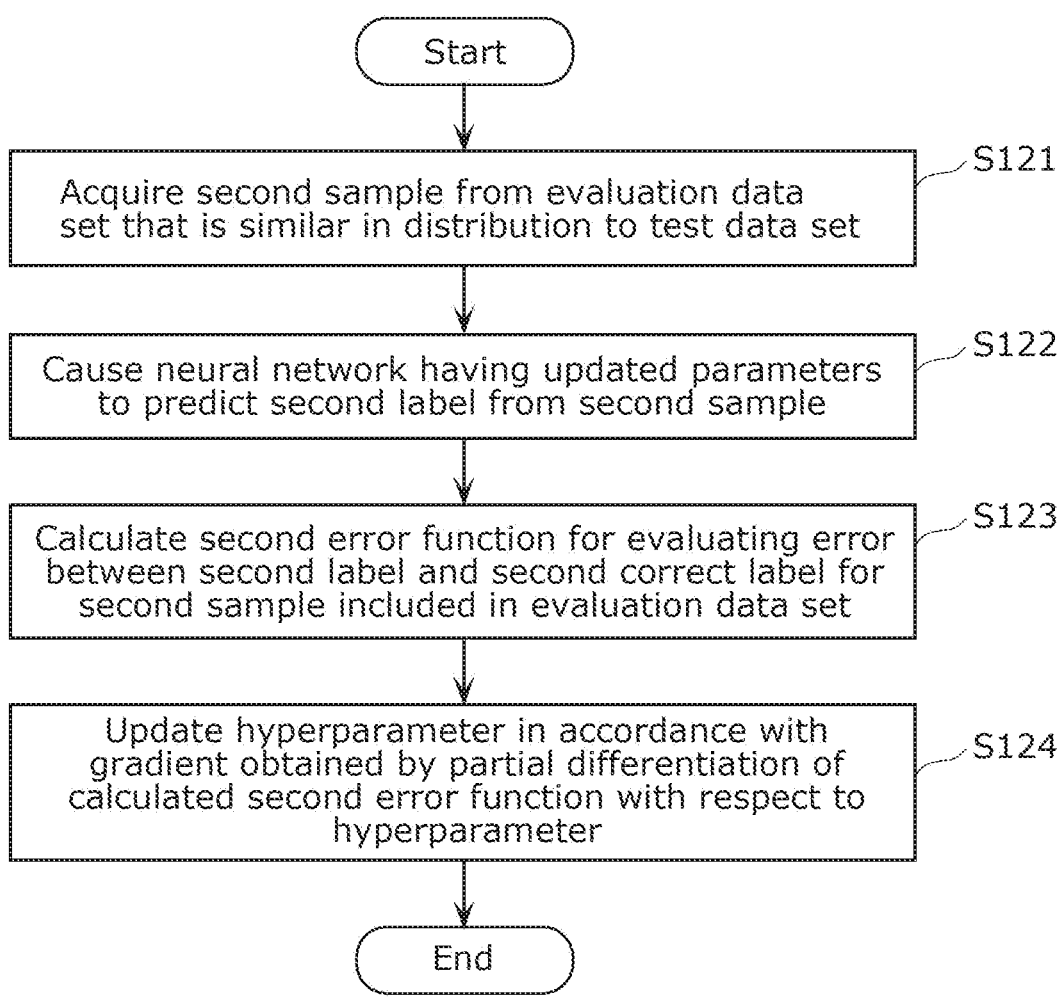
FIG. 5 is a flowchart illustrating detailed operations performed in second optimization processing illustrated in FIG. 3.

FIG. 5 is a flowchart illustrating detailed operations performed in the second optimization processing illustrated in FIG. 3.

In the second optimization processing, first, learning device 10 acquires the second sample from the evaluation data set that is similar in distribution to the test data set (S121).

Next, learning device 10 causes the neural network whose parameters have been updated in the first optimization processing to predict the second label from the second sample (S122). For example, when f is the function indicating prediction processing that is performed by the neural network and $\theta$ indicates a plurality of parameters including a weight, learning device 10 exerts $f(\theta)$ on the second sample so as to cause the neural network to predict the second label.

Next, learning device 10 calculates a second error function for evaluating an error between the second label predicted in step S122 and the second correct label for the second sample included in the evaluation data set (S123).

Here, the second error function may, for example, be a loss function called the KL divergence, or may be a cross-entropy error function.

Next, learning device 10 updates the hyperparameter in accordance with a gradient obtained by partial differentiation of the second error function calculated in step S123 with respect to the hyperparameter (S124). Here, learning device 10 updates the hyperparameter in accordance with the gradient so as to reduce a difference between the distribution of the evaluation data set and the distribution of the data-augmented training data set obtained by performing the data augmentation processing on the training data set.

In this way, learning device 10 is capable of performing the second optimization processing for optimizing the hyperparameter for each sample used in the data augmentation processing, using the evaluation data set.

Example 1

Hereinafter, Example 1 according to the present embodiment will be described.

Figure 6:
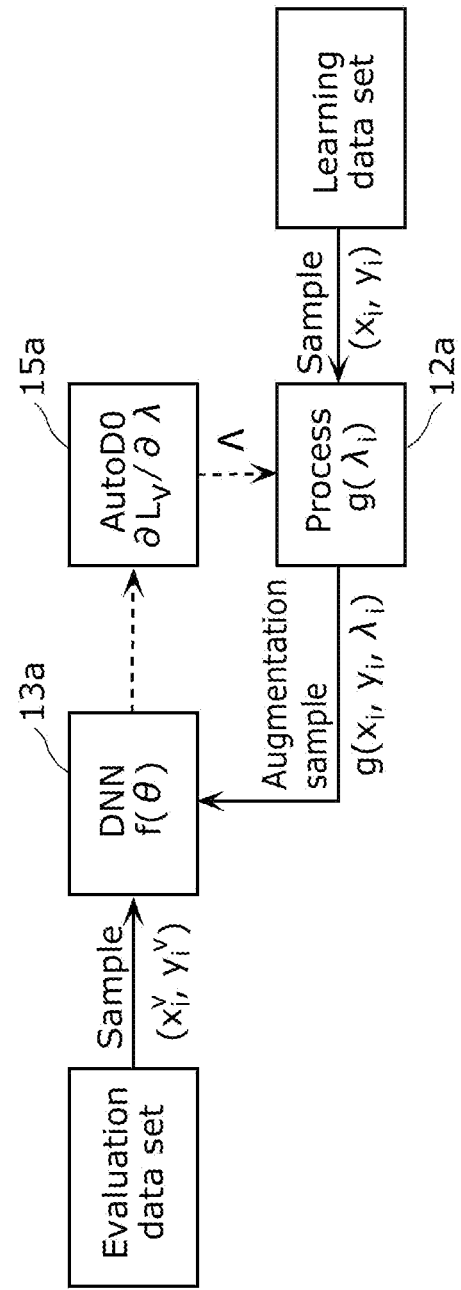
FIG. 6 is a diagram for conceptually describing exemplary processing according to Example 1 in which the first optimization processing and the second optimization processing are alternately performed.

FIG. 6 is a diagram for conceptually describing an example of processing according Example 1 in which the first optimization processing and the second optimization processing are alternately performed.

Process 12a indicates a data augmentation processing function performed by data augmentation processing unit 12, and $g(\lambda i)$ indicates a function that indicates the data augmentation processing and in which the hyperparameter $\lambda_i$ is converted into an implicit function. In the first optimization processing according to the example illustrated in FIG. 6, Process 12a acquires sample $(x_i, y_i)$ from the training data set and performs data augmentation processing using hyperparameter $\lambda_i$ on sample $(x_i)$. Then, Process 12a outputs augmented sample $g(x_i, y_i, \lambda_i)$ obtained by the data augmentation processing to DNN 13a.

DNN 13a indicates the neural network having the parameters $\theta$ of DNN 13, and $f(\theta)$ indicates a function that indicates prediction processing performed by the neural network. The example illustrated in FIG. 6 shows that, in the first optimization processing, the neural network of DNN 13a is trained using augmented sample $g(x_i, y_i, \lambda_i)$ output from Process 12a.

In the second optimization processing according to the example illustrated in FIG. 6, sample $(x_i^v, y_i^v)$ is acquired from the evaluation data set, and sample $(x_i^v)$ is input to DNN 13a, DNN 13a performs prediction processing by exerting function $f(\theta)$ on sample $(x_i^v)$. Then, DNN 13a outputs the correct label for sample $(x_i^v)$ obtained by the prediction processing.

AutoD0 15a indicates a second optimization processing function performed by optimizer 15, and $\partial L_v/\partial \lambda$ indicates a gradient obtained by differentiation (partial differentiation) of error function $L_v$ calculated based on the result of the prediction processing performed by DNN 13a with respect to hyperparameter $\lambda$. More specifically, the second optimization processing involves calculating error function $L_v$ between the correct label for sample $(x_i^v)$ obtained by the prediction processing and correct label $(y_i^v)$ for sample $(x_i^v)$ acquired from the evaluation data set. Then, AutoD0 15a optimizes hyperparameter $\lambda$ by updating $\lambda_i$ in accordance with the gradient obtained by partial differentiation of the calculated error function $L_v$ with respect to $\lambda_i$.

Figures 7A, 7B:
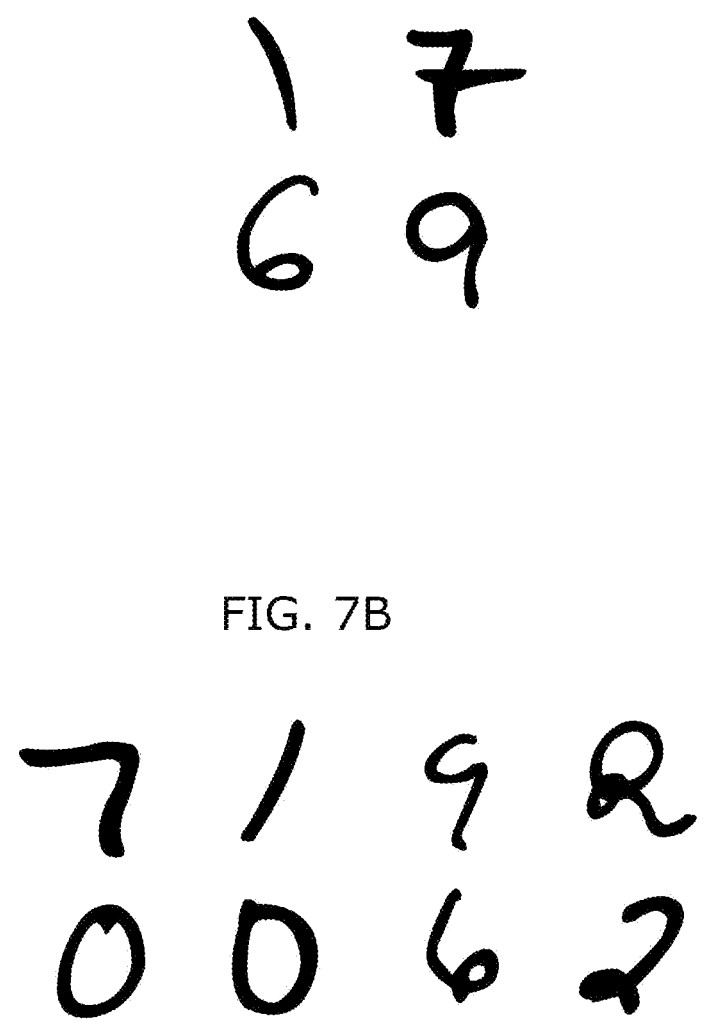

FIG. 7A shows one example of the evaluation data set according to Example 1. FIG. 7B shows one example of the training data set according to Example 1.

Samples included in the evaluation data set illustrated in FIG. 7A are image data of digit numbers 1, 6, 7, and 9. FIG. 7A shows, by way example, samples included in the data set that is similar in distribution to the test data set for evaluating the performance of trained DNN 13a.

On the other hand, samples included in the training data set illustrated in FIG. 7B are image data of digit numbers 0, 0, 1, 2, 6, 9 and so on. FIG. 7B shows, by way of example, that samples include biases and the correct labels for the samples include noise (label noise).

Figure 8A:
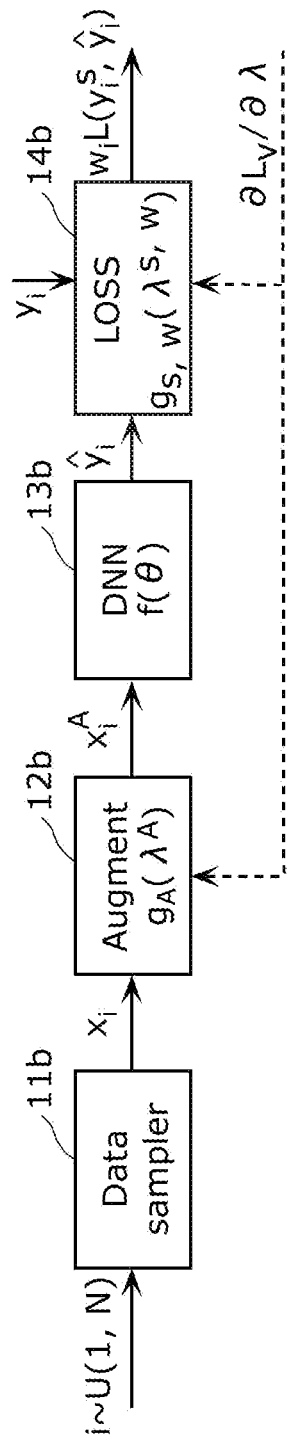
FIG. 8A is a diagram for conceptually describing an exemplary function of performing the first optimization processing according to Example 1.
Figure 8B:
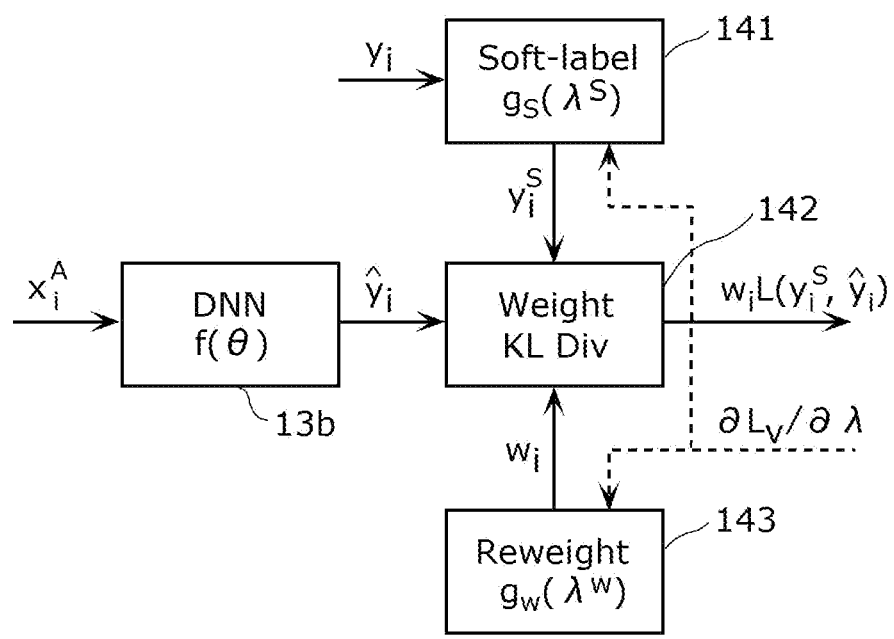
FIG. 8B is a diagram for describing specific functions included in a LOSS function illustrated in FIG. 8A.

FIG. 8A is a diagram for conceptually describing an exemplary function of performing the first optimization processing according to Example 1. FIG. 8B is a diagram for describing specific functions of LOSS 14b illustrated in FIG. 8A.

Data sampler 11b indicates an acquisition processing function performed by acquirer 11 in the first optimization processing and acquires sample $x_i$ from a training data set indicated by i to U (1, N).

Augment 12b indicates a data augmentation processing function performed in the first optimization processing by data augmentation processing unit 12, and $g_A(\lambda^A)$ indicates a function that indicates the data augmentation processing and in which hyperparameter $\lambda^A$ is converted into an implicit function. In the example illustrated in FIG. 8A, $g_A(\lambda^A)$ in Augment 12b has hyperparameter $\lambda^A$ updated in accordance with gradient $\partial L_v/\partial \lambda$ in the second optimization processing.

Augment 12b performs data augmentation processing by exerting $g_A(\lambda^A)$ on sample $x_i$ acquired by Data sampler 11b. Then, Data sampler 11b outputs augmented sample $x_i^A$ obtained by the data augmentation processing to DNN 13b.

DNN 13b indicates the neural network having parameters θ of DNN 13, and f(θ) indicates the function indicating prediction processing performed by the neural network. In the example illustrated in FIG. 8A, in the first optimization processing, DNN 13b performs data prediction processing by exerting f(θ) on augmented sample $x_i^A$ output from Augment 12b. Then, DNN 13b outputs correct label:

$$\hat{y}_i \quad [\text{Math. 1}]$$

for augmented sample $x_i^A$ obtained by the prediction processing.

LOSS 14b indicates a processing function of calculating the error function (first error function) in the first optimization processing. Here, $g_{s,w}(\lambda^{s,w})$ indicates the error function (first error function) in the first optimization processing using a weight (weight loss) for each sample that is assigned to capture a bias to the sample and a soft label for coping with a correct label with a large amount of noise, where $\lambda^{s,w}$ indicates the hyperparameter for the weight loss and the soft label and is converted into an implicit function.

Note that hyperparameter $\lambda^{s,w}$ is updated in accordance with gradient $\partial L_v/\partial \lambda$ in the second optimization processing.

To be more specific, LOSS 14b has functions of Soft-label 141, Weight KL Div 142, and Reweight 143 as illustrated in FIG. 8B.

Soft-label 141 may, for example, convert the correct value indicated by the input correct label into a soft label and output the soft label, using Gumbel-Softmax or Softmax, Here, $g_s(\lambda^s)$ indicates a function that indicates soft labelling for coping with a correct label with a large amount of noise, and hyperparameter $\lambda^s$ is converted into an implicit function.

In the example illustrated in FIG. 8B, Soft-label 141 receives input of correct label $y_i$ for sample $x_i$ from a training data set indicated by i to U (1, N) and converts input correct label $y_i$ into a soft label. Soft-label 141 then outputs soft label $y_i^s$ obtained by the soft labelling to Weight KL Div 142.

Here, for example, Soft-label 141 may calculate soft label $y_i^s$ for each sample from correct label $y_i$, using an expression written as $y_i^s = g_s(y_i, \lambda_i^s) = \text{softmax}(\lambda_i^S)$. Here, $\lambda_i^S$ is the hyperparameter of the soft label for each sample and converted into an implicit function.

Weight KL Div 142 calculates the error function (first error function) in the first optimization processing using a weight (weight loss) for each sample and a soft label for coping with a correct label with a large amount of noise. More specifically, Weight KL Div 142 calculates first error function L that is the KL divergence for evaluating an error between soft label $y_i^s$ output from Soft-label 141 and correct label:

$$\hat{y}_i \quad [\text{Math. 2}]$$

output from DNN 13b. Then, Weight KL Div 142 assigns weight $w_i$ (scalar) calculated by Reweight 143 to the first error function so as to calculate weighed first error function:

$$w_i L(y_i^S, \hat{y}_i). \quad [\text{Math. 3}]$$

Reweight 143 calculates weight $w_i$ for each sample that is assigned to capture a bias to the simple, using an activation function such as softplus. Here, $g_w(\lambda^w)$ indicates a function for calculating a weight (weight loss) for each sample that is weighed to error function L for capturing a bias to the sample.

In the example illustrated in FIG. 8B, Reweight 143 calculates weight $w_i$ of an expression written as $g_w(L_i, \lambda_i^w) = w_i L_i$ and outputs the calculated weight to Weight KL Div 142. For example, Reweight 143 calculates weight $w_i$ for each sample, using an expression written as $w_i = 1.44 \times \text{softplus}(\lambda_i^W)$. Here, $\lambda_i^W$ is the hyperparameter of the weight (weight loss) for each sample and converted into an implicit function.

In the first optimization processing, parameters θ of DNN 13b can be updated, using weighed first error function:

$$w_i L(y_i^S, \hat{y}_i) \quad [\text{Math. 4}]$$

calculated as described above.

Next, the optimization processing procedure for alternately performing the first optimization processing and the second optimization processing according to Example 1 will be described with reference to FIG. 9.

FIG. 9 illustrates pseudocode of algorithm 1 showing one example of the optimization processing procedure for alternately performing the first optimization processing and the second optimization processing according to Example 1. Note that the variables such as λ and the functions such as f(θ) illustrated in FIG. 9 are as described with reference to FIGS. 8A and 8B. In FIG. 9, samples included in the training data set described above are referred to and expressed as data.

Algorithm 1 illustrated in FIG. 9 is executed by, for example, the processor of learning device 10.

As illustrated in FIG. 9, the procedure in Line 1 prescribes that parameters θ and hyperparameters A are initialized.

Line 2 prescribes that the procedure in Lines 3 to 19, i.e., the first optimization processing and the second optimization processing, is repeated until epochs are reached.

Line 3 prescribes that the procedure in Lines 4 to 9, i.e., the first optimization processing, is repeated until the number of batches is reached.

Line 4 prescribes that a batch is sampled from training data set $D_{train}$. Note that the batch as used herein corresponds to data (sample described above) included in a subset when the training data set is divided into several subsets.

Line 5 prescribes that sampled data x is subjected to data augmentation processing.

Line 6 prescribes that a correct label is predicted from data $x^A$ obtained by the data augmentation processing in Line 5.

Line 7 prescribes that soft labels are generated for correct labels that are acquired from training data set $D_{train}$ and that are correct labels for data x sampled from training data set $D_{train}$ in Line 4.

Line 8 prescribes that the weighted error function is calculated using the KL divergence and differentiated ($\nabla_\theta$) with respect to parameter $\theta$.

Line 9 prescribes that parameter $\theta$ of function $f(\theta)$ indicating prediction processing performed by the neural network is updated.

Line 10 prescribes that the procedure in Line 11 onward is performed when epochs exceed E.

Line 11 prescribes that the procedure in Lines 12 to 19, i.e., the second optimization processing, is repeated until the number of batches is reached.

Line 12 prescribes that a batch is sampled from training data set $D_{train}$.

Line 13 prescribes that a batch is sampled from evaluation data set $D_{val}$.

Line 14 prescribes that a correct label is predicted from data $X^v$ included in evaluation data set $D_{val}$ sampled in Line 13.

Line 15 prescribes that a correct label is predicted from data $X^A$ obtained by performing data augmentation processing on the data included in training data set $D_{train}$ sampled in Line 12.

Line 16 prescribes that a soft label is generated for a correct label that is acquired from training data set $D_{train}$ and that is the correct label for data x sampled from training data set $D_{train}$ in Line 12.

Lines 17 and 18 prescribe that error function and error function L in Line 18 are calculated, and error function $L_v$ is differentiated ($\nabla_\lambda$) with respect to hyperparameter $\lambda$. Here, error function $L_v$ is an error function for evaluating an error between data included in evaluation data set $D_{val}$ and the correct label for the data predicted in Line 14. Error function L is obtained by assigning a weight to the error function for evaluating an error between the soft label generated in Line 16 and the correct label for data-augmented data $X^A$ predicted in Line 15.

Line 18 prescribes that hyperparameter $\lambda$ is updated. Note that HO in Line 19 is an abbreviation for "hyperparameter optimization".

By executing algorithm 1 prescribed as described above, it is possible to alternately perform the first optimization processing and the second optimization processing.

1.4 Advantageous Effects

As described above, learning device 10 and the data augmentation method according to the present embodiment are capable of optimizing hyperparameters. Thus, it is possible to increase the number of samples included in the training data set in order to acquire a high-precision AI model.

More specifically, in the process of training of the neural network for optimizing a plurality of parameters of the neural network, a difference between the distribution of the test data set and the distribution of the data-augmented training data set can be minimized by using the gradient obtained by partial differentiation of the hyperparameters for each sample. Thus, even if the neural network is trained using the data-augmented training data obtained by the data augmentation processing, it is possible to increase the number of samples included in the training data set so as to bring the decision plane that is generated by learning close to an ideal decision plane. In this way, it is possible to increase the number of samples included in the training data set in order to acquire a high-precision AI model.

Conventionally, it has been necessary, in order to perform the data augmentation processing, to adjust large-scale hyperparameters that define the method of converting the training data set. There is also a problem that it is not possible to acquire a high-precision AI model if the parameters of the neural network are trained using an incomplete training data set that includes biases in the distribution of data and inaccurate correct labels. Therefore, bi-level optimization calculations become necessary, the calculations including a calculation for training of the neural network and a calculation for optimizing large-scale hyperparameters of the training data set in order to perform the data augmentation processing. Accordingly, an enormous calculation cost becomes necessary to optimize the hyperparameters.

In contrast to this, learning device 10 and the data augmentation method according to the present embodiment are capable of performing the optimization of the hyperparameters for each sample together with the training of the parameters of the neural network by alternately optimizing the parameters of the neural network and the hyperparameters used in the data augmentation processing for each sample. This also achieves advantageous effects such as a reduction in the calculation cost required to optimize the parameters of the neural network and to optimize the hyperparameters for each sample.

In learning device 10 and the data augmentation method according to the present embodiment, the hyperparameters are updated in accordance with the gradient so as to reduce a difference between the distribution of the evaluation data set and the distribution of the data-augmented training data set obtained by performing the data augmentation processing on the training data set.

Therefore, the hyperparameters can be updated so as to minimize a difference between the distribution of the test data set and the distribution of the data-augmented training data set. Accordingly, it is possible to bring the decision plane that is generated by learning close to an ideal decision plane, even if the neural network is trained using the data-augmented training data obtained by the data augmentation processing.

In learning device 10 and the data augmentation method according to the present embodiment, the hyperparameters are converted into implicit functions in at least the function indicating the data augmentation processing, and the neural network is an exact differentiable parameter. The use of implicit differentiation enables calculating partial differential of the hyperparameters.

Learning device 10 and the data augmentation method according to the present embodiment calculate the first error function used in the first optimization processing using a soft label for coping with a correct label with a large amount of noise. This reduces noise in the correct label for the sample, included after the data augmentation. Accordingly, it is possible to optimize the hyperparameters for each sample so as to minimize a difference between the distribution of the test data set and the distribution of the data-augmented training data set by using the gradient obtained by partial differentiation of the hyperparameter for each sample.

Learning device 10 and the data augmentation method according to the present embodiment assign a weight to the calculated first error function, using a weight for each sample for capturing a bias to the sample.

Therefore, it is possible to capture and reduce a bias to the sample. Accordingly, the hyperparameters for each sample can be optimized so as to minimize a difference between the distribution of the test data set and the distribution of the data-augmented training data set by using the gradient obtained by partial differentiation of the hyperparameters for each sample.

Comparative Example

The following description is given of a data augmentation method according to a comparative example and problems with this data augmentation method.

Figure 10:
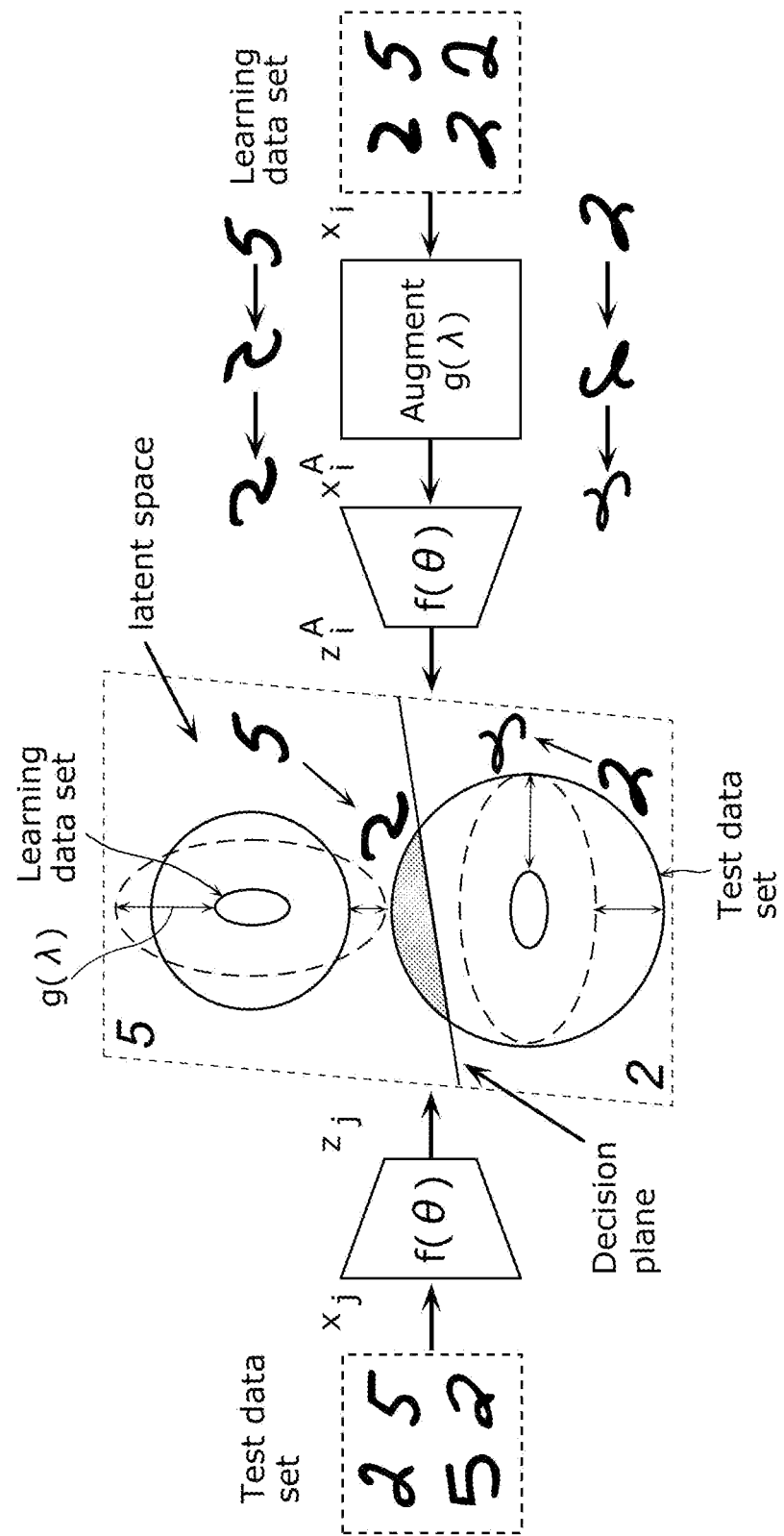
FIG. 10 is a diagram for describing problems that arise when data augmentation is performed using a hyperparameter that is shared among all data according to a comparative example.

FIG. 10 is a diagram for describing problems that arise when data augmentation is performed using hyperparameters shared among all data according to a comparative example.

FIG. 10 illustrates a decision plane (decision line) when neural network $f(\theta)$ is trained using a data-augmented training data set obtained by data augmentation processing $g(\lambda)$ using hyperparameters A shared among all data. In FIG. 10, the smallest solid circle in each of upper and lower regions above and below the decision plane, which are dotted squares in the center, conceptually indicates the distribution of training data. The dotted circle in each of the upper and lower regions conceptually indicates the distribution of a data-augmented training data set obtained by data augmentation processing $g(\lambda)$. The largest solid circle in each dotted square conceptually indicates the distribution of a test data set.

In the case where data is augmented by data augmentation processing $g(\lambda)$ according to the comparative example in FIG. 10, the distribution of all data, i.e., numeric characters, in the training data set is increased uniformly. The decision plane obtained by learning that uses such data-augmented training data set crosses over part of the test data set. Thus, there is a problem that it is not possible to properly identify the test data set.

That is, the data augmentation method according to the comparative example has the problem in that the decision plane that is generated by learning may deviate considerably from an ideal boundary line. Note that this problem is considered to arise due to data augmentation performed in accordance with the distribution of the training data set.

Hereinafter, the problem with the data augmentation according to the comparative example will be described concretely.

Figure 11:
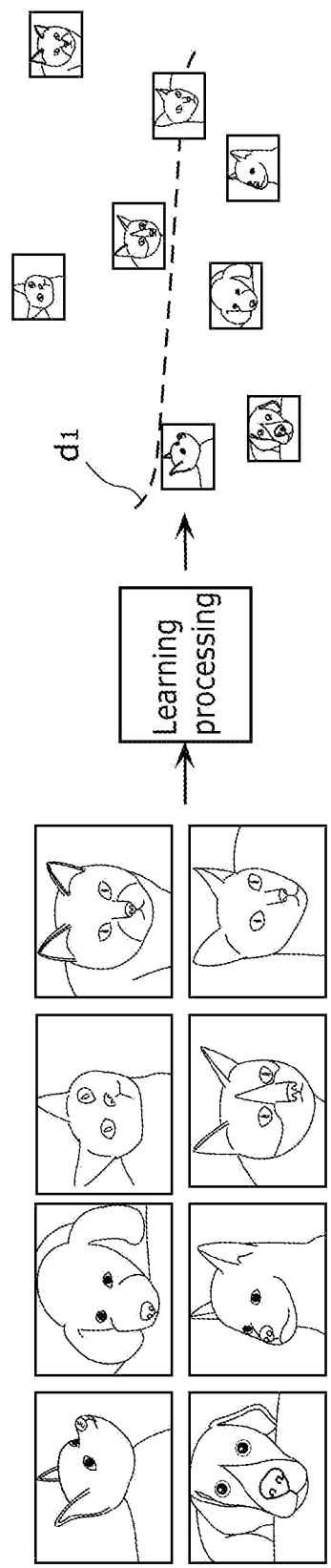
FIG. 11 is a diagram for conceptually describing the generation of a decision plane by learning processing.

FIG. 11 is a diagram for conceptually describing the generation of the decision plane by learning processing. In a classification issue as illustrated in FIG. 11, if learning processing is performed using a training data set that includes images of various dogs and cats and correct labels for these images, AI generates decision plane $d_1$ by feature extraction. As can be seen from FIG. 11, generating decision plane $d_1$ conceptually corresponds to drawing a boundary line to distinguish between dogs and cats.

Figure 12A:
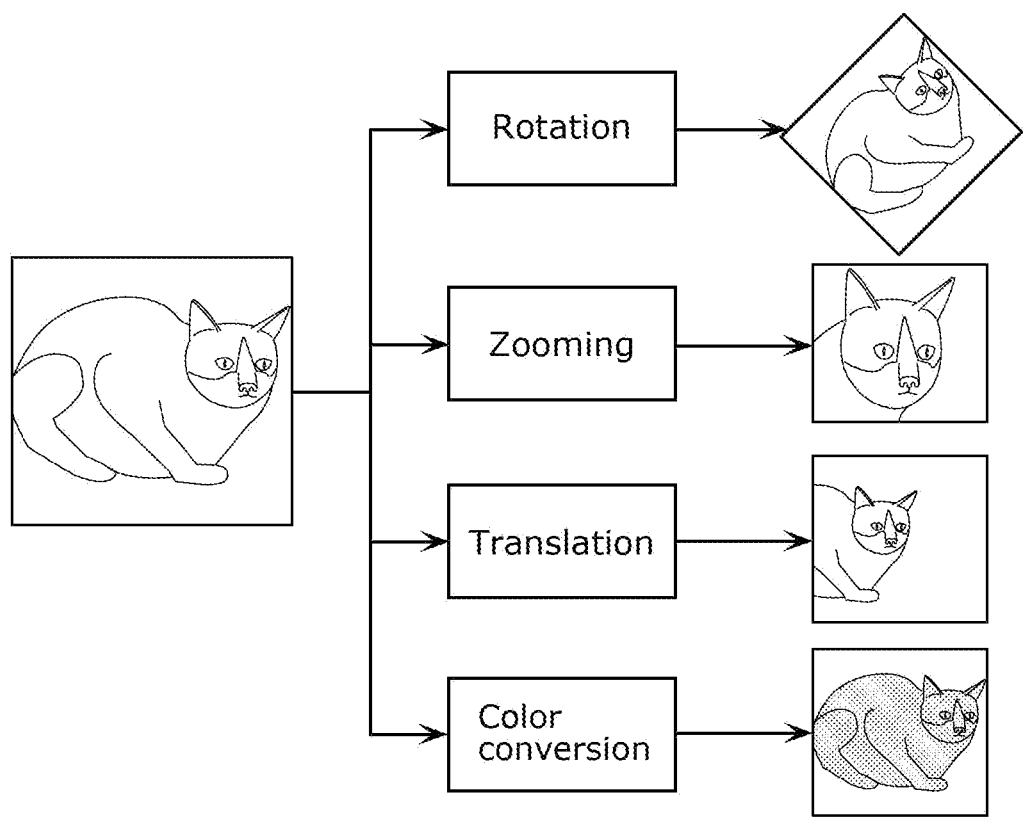
FIG. 12A is a diagram or conceptually describing data augmentation processing.

FIG. 12A is a diagram for conceptually describing the data augmentation processing.

As illustrated in FIG. 12A, the data augmentation processing that is performed on the training data set is processing for artificially increasing or padding the number of data pieces that configure the training data set, by performing conversion processing such as rotation, zooming, translation, or color conversion on the data included in the training data set.

Figure 12B:
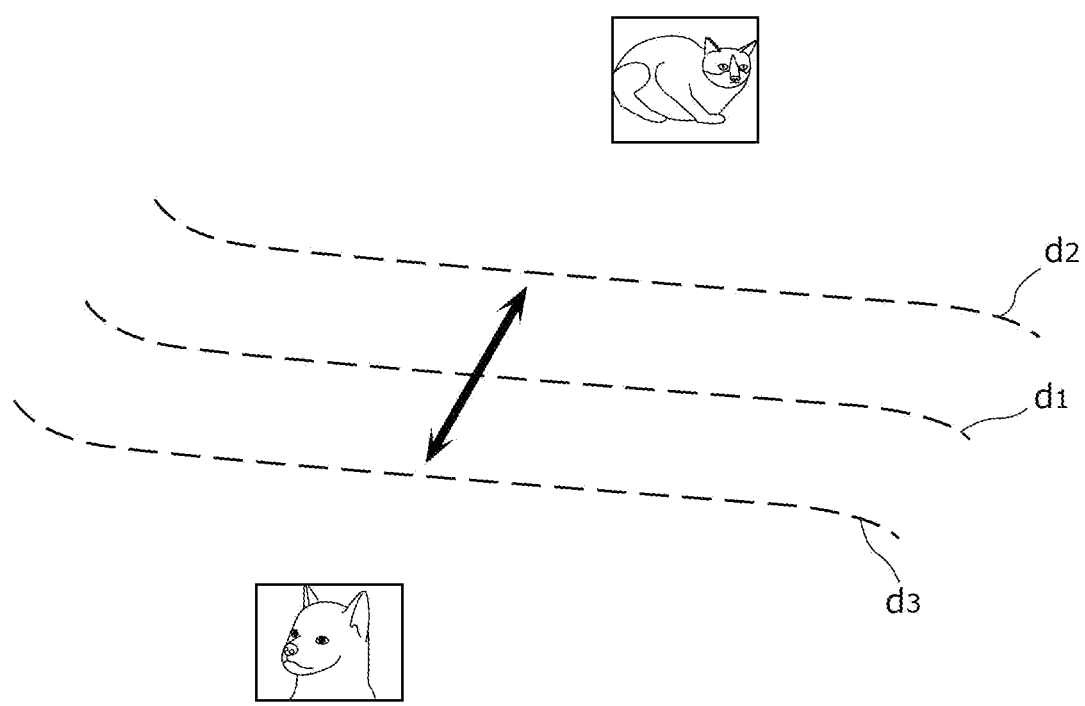
FIG. 12B is a diagram for conceptually describing problems that arise with the generation of the decision plane by the learning processing when there is a small amount of data included in training data sets.
Figure 12C:
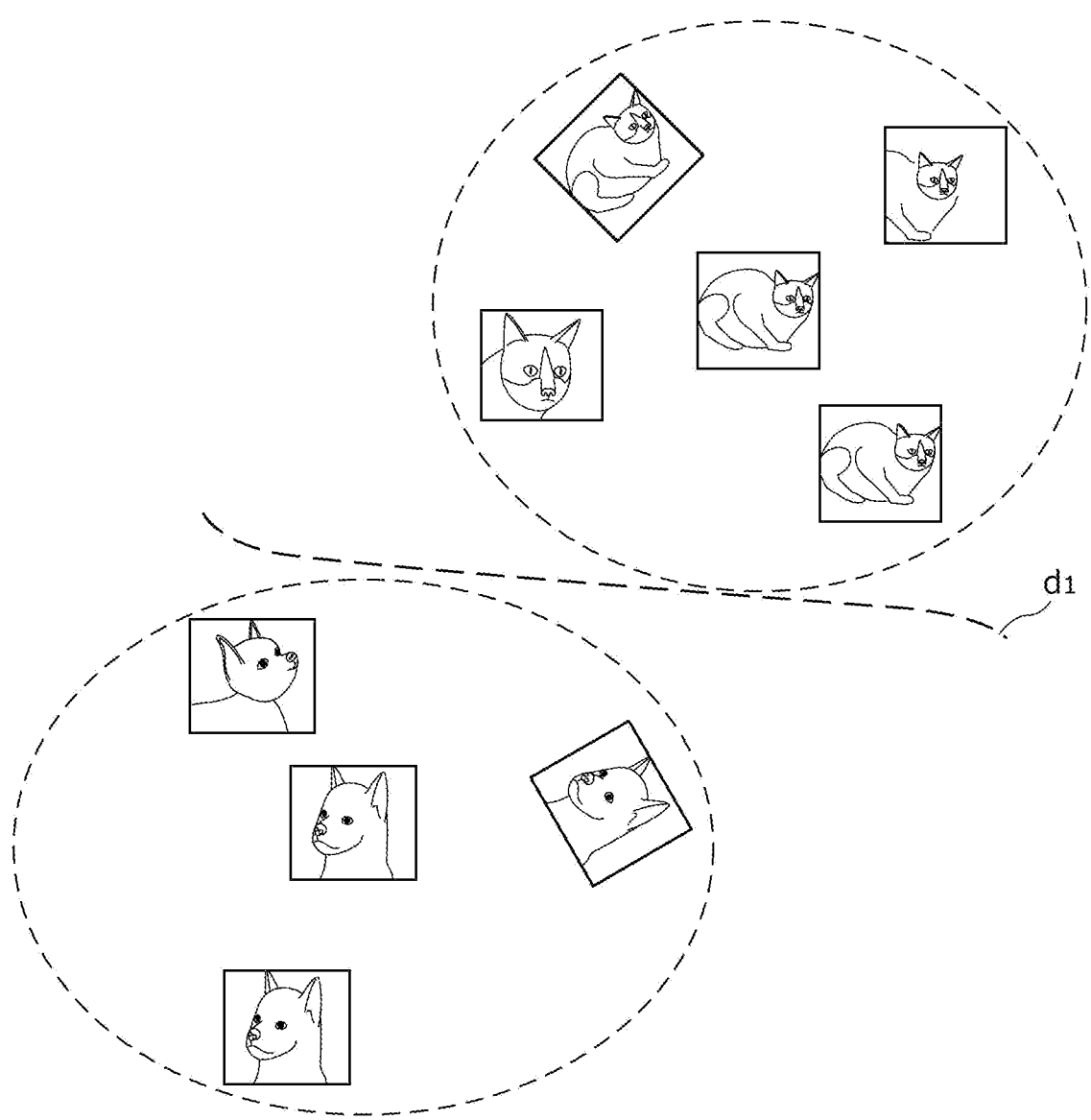
FIG. 12C is a diagram for conceptually describing one example of generating the decision plane by learning processing using data-augmented training data sets obtained by data augmentation processing.

FIG. 12B is a diagram for conceptually describing problems with the generation of the decision plane by learning processing when there is a small number of data pieces included in the training data set. FIG. 12C is a diagram for conceptually describing one example of generating the decision plane by learning processing that uses the data-augmented training data set obtained by the data augmentation processing.

In the case where there is a small number of data pieces included in the training data set as illustrated in FIG. 12B, a large clearance exists between dog data and cat data. Thus, Ai is confused about where to draw the boundary line to distinguish between dogs and cats as indicated by decision planes $d_1$, $d_2$, and $d_3$.

On the other hand, in the case where data is properly augmented by the data augmentation processing as illustrated in FIG. 12C, the clearance illustrated in FIG. 12B can be artificially filled in with augmented data. Thus, AI can easily draw a boundary line to distinguish between dogs and cats as indicated by decision plane $d_1$.

Next, problems with the data augmentation processing will be described.

Figure 13:
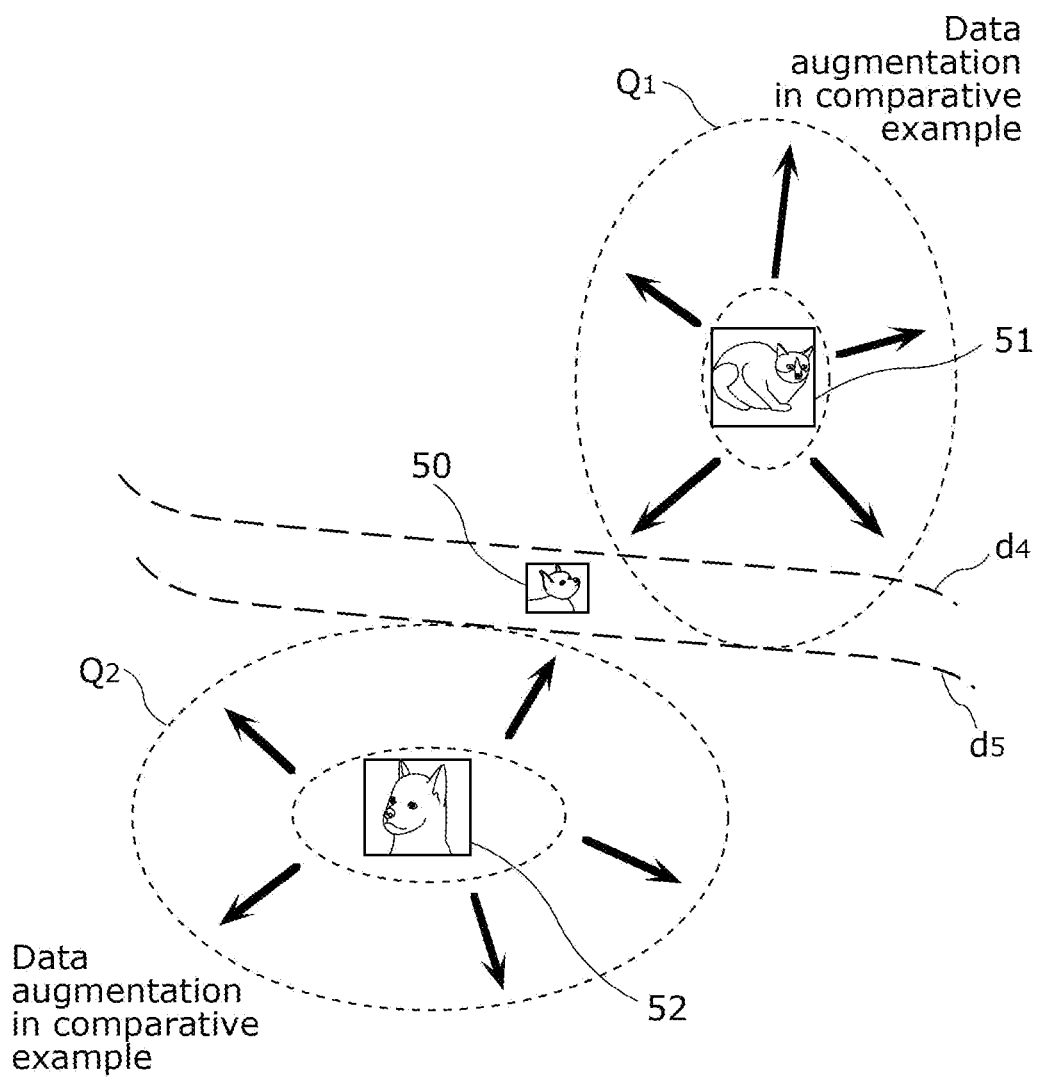
FIG. 13 is a diagram for describing problems that arise in data augmentation processing according to a comparative example.

FIG. 13 is a diagram for describing problems with the data augmentation processing according to the comparative example. FIG. 13 shows that, if data augmentation is performed improperly, the position of the decision plane generated by learning may deviate from an ideal decision plane.

In FIG. 13, data augmentation is performed on cat data 51 so that distribution $Q_1$ is obtained as the distribution of augmented cat data included in a training data set. Similarly, data augmentation is performed on dog data 52 so that distribution $Q_2$ is obtained as the distribution of augmented dog data included in a training data set. In this case, AI learns the data-augmented training data sets and thereby generates decision plane $d_5$ at a position that deviates from the position of ideal decision plane $d_4$. So, if image 50 of a dog included in the test data set is located at a position that deviates from distribution $Q_2$ of augmented dog data included in the training data set, AI will identify image 50 of the dog in the test data set as a cat.

As described above, in the case where data augmentation is performed in accordance with the distribution of the training data set, the position of the decision plane generated by learning may deviate from the position of an ideal decision plane.

Figure 14:
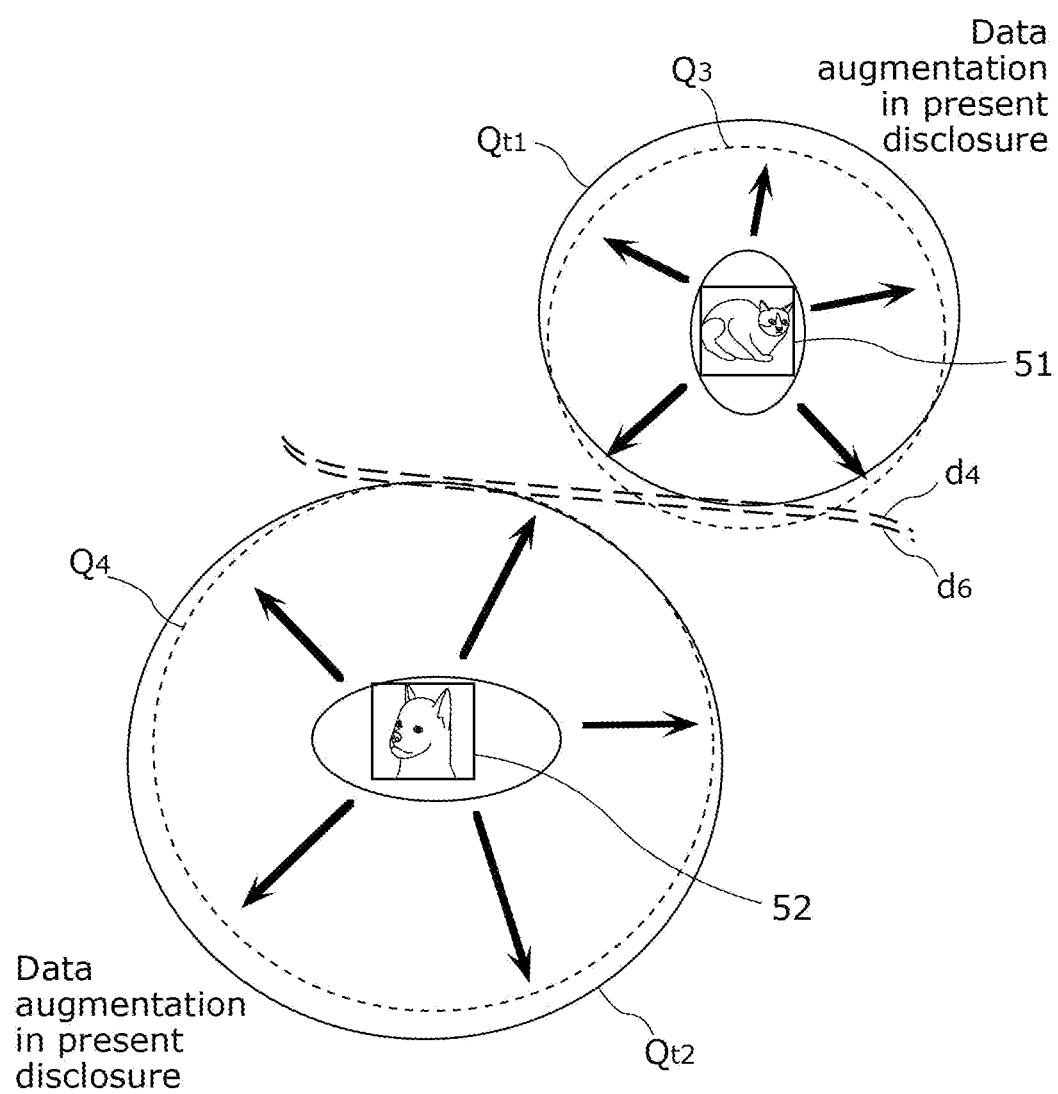
FIG. 14 is a diagram for conceptually describing the decision plane generated using data-augmented training data sets obtained by the data augmentation processing according to the present disclosure.

FIG. 14 is a diagram for conceptually describing a decision plane generated using a data-augmented training data set obtained by the data augmentation processing according to the present disclosure.

According to the present disclosure, the training data set is subjected to the data augmentation processing so as to match the distribution of the training data set to the distribution of a test data set. More specifically, cat data 51 is augmented in accordance with distribution $Q_{t1}$ of a test data set on cats so as to match the distribution of a training data set on augmented cat data to distribution $Q_3$. Similarly, dog data 52 is augmented in accordance with distribution $Q_{t2}$ of a test data set on cats so as to match the distribution of a training data set on augmented dog data to distribution $Q_4$.

Accordingly, AI can generate decision plane $d_6$ at a position close to the position of ideal decision plane $d_4$.

EXAMPLES

The advantageous effects of the data augmentation method according to the present disclosure are verified using the street view house numbers (SVHN) dataset, and the result of the verification is described as an example, FIG. 15 shows the result of the verification in which an error rate for a test data set is evaluated after learning using a training data set according to an example.

The SVHN data set has an enormous amount of labelled data, such as more than 600,000-digit images, incorporated therein. The SVHN data set includes 73,257-digit training data sets and 26,032-digit test data sets. The SVHN data set further additionally includes 531,131 samples with relatively low degrees of difficulty that can be used as additional training data.

In the present example, 32% of the training data sets included in the SVHN data set are divided into evaluation data sets.

In the present example, training data sets with no data bias and no label noise and training data sets with a data bias or label noise are used as training data sets for verification. In FIG. 15, the presence or absence of a data bias and the presence or absence of label noise are indicated by a class imbalance ratio (IR) indicating a data bias and a label noise ratio (NR). Note that the training data sets included in the SVHN data set correspond to the training data sets with no data bias and no label noise.

For example, the case where IR-NR is "100-0.1" means that 10% (NR=0.1) of image data that are randomly selected from all image data are inverted at random and have label noise. Also, for example, the number of image data pieces indicating {0 to 4} is 10 times the number of image data pieces indicating {5 to 9}. This means that the number of samples in the class is nonuniform, i.e., there is a data bias.

Accordingly, training data sets whose IR-NR is "1-0.0" in FIG. correspond to the training data sets with no data bias and no label noise. Learning data sets whose IR-NR is "100-0.0" correspond to training data sets with a data bias but with no label noise. Similarly, training data sets whose IR-NR is "1-0.1" correspond to training data sets with no data bias but with label noise. Learning data sets whose IR-NR is "100-0.1" correspond to training data sets with a data bias and label noise.

In FIG. 15, $\lambda^A$ (ours), $\lambda^{A,W}$(ours), and $\lambda^{A,W,S}$(ours) indicate the data augmentation method according to the present disclosure. In the data augmentation method according to the present disclosure, the learning processing, i.e., the first optimization processing and the second optimization processing, is performed using algorithm 1 illustrated in FIG. 9. The second optimization processing is started after execution of the 50th epoch.

In FIG. 15, $\lambda^A$(ours) indicates that optimization is performed only on hyperparameter $\lambda^A$ serving as a variable that prescribes data conversion processing for each sample used in the data augmentation processing. Moreover, $\lambda^{A,W,S}$(ours) indicates that optimization is performed on hyperparameters of the data augmentation processing, weight losses, and soft labels, and $\lambda^{A,W}$(ours) indicates that optimization is performed on hyperparameters of the data augmentation processing and weight losses. Each optimization processing described above is performed using algorithm 1 illustrated in FIG. 9, FIG. 15 also shows the result of verification of $\lambda^{ASHA}$ (ours) as a comparative example. In FIG. 15, $\lambda^{ASHA}$(ours) indicates that optimization is performed on hyperparameter $\lambda^{ASHA}$ that is not for each data piece but shared among all data pieces.

FIG. 15 further shows the result of verification of Baseline and FAA as comparative examples. More specifically, Baseline shows the result of verification for the case where the data augmentation processing is performed by only the method described in NPL 1, i.e., by only standard conversion processing such as random cropping, horizontal inversion, and erasing. Fast AutoAugment (FAA) shows the result of verification for the case where the data augmentation processing is performed by the method described in NPL 2.

As can be seen from FIG. 15, in the case of using a training data set with a data bias or label noise, the results of verification of $\lambda^A$(ours) and $\lambda^{A,W}$(ours) achieve an approximately equivalent or lower error rate (Top-1 error rate) as compared with the results of verification of $\lambda^{ASHA}$, Baseline, and FAA.

When compared with the results of verification of $\lambda^{ASHA}$, Baseline, and FAA, the results of verification of $\lambda^{A,W,S}$(ours) achieves an improved error rate (Top-1 error rate), irrespective of the presence or absence of a data bias and label noise in the training data set.

From the above, it is found that not only the optimization of hyperparameters $\lambda^{A,W,S}$(ours) but also the optimization of hyperparameter $\lambda^A$(ours) are effective.

Figure 16:
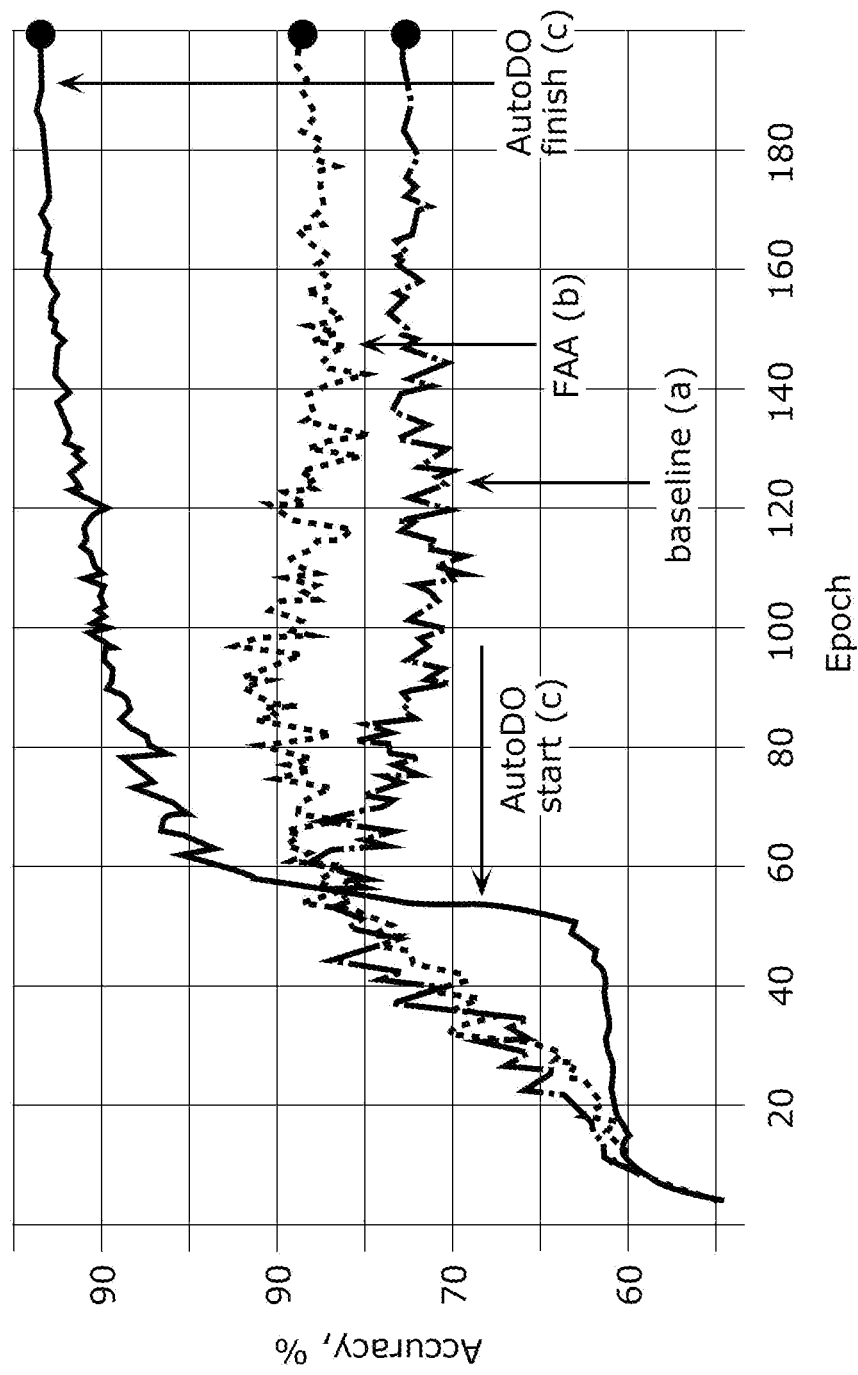
FIG. 16 shows accuracy learning curves obtained by learning using the training data sets according to an example.

FIG. 16 shows accuracy learning curves when learning is performed using training data sets according to the examples. FIG. 16 shows accuracy learning curve (c) when learning is performed using a training data set whose IR-NR is "1-0.0". In FIG. 16, the optimization processing for $\lambda^{A,W,S}$(ours) described above corresponds to AutoDO, and the start of the second optimization processing during the optimization processing (data augmentation method according to the present disclosure) for $\lambda^{A,W,S}$(ours) described above is indicated as AutoDO start. AutoDO start is started after execution of the 50th epoch.

As comparative examples, FIG. 16 also shows accuracy learning curves (a) and (b) when Baseline and FAA described above are trained using a training data set according to the examples.

It can be seen from FIG. 16 that the data augmentation method according to the present disclosure does not improve performance before AutoDO, i.e., the second optimization processing, is started. It is also found that the data augmentation method according to the present disclosure can effectively optimize hyperparameters $\lambda^{A,W,S}$ and sharply improve performance by performing AutoDO, i.e., the second optimization processing.

Possibility of Other Embodiments

Although the data augmentation method and the learning device according to the present disclosure have been described thus far in the embodiment, there are no particular limitations on the subject matter and the devices that implement each processing. The processing may be implemented by a processor or the like incorporated in a specific device disposed locally. The processing may also be implemented by a cloud server or the like disposed in a place different from places where local devices are disposed.

Note that the present disclosure is not intended to be limited to the embodiment described above. For example, the present disclosure may also include other embodiments that are implemented by any combination of constituent elements described in the specification of the present disclosure or by excluding some constituent elements. The present disclosure may also include variations obtained by applying various modifications conceivable by those skilled in the art to the embodiment described above without departing from the scope of the present disclosure, i.e., without departing from the languages recited in the scope of the present disclosure.

The present disclosure further includes cases as described below.
(1) Each device described above is specifically a computer system configured by, for example, a microprocessor, a ROM, a RAM, a hard disk unit, a display unit, a keyboard, and a mouse. The RAM or the hard disk unit stores computer programs. Each device achieves its functions as a result of the microprocessor operating in accordance with the computer programs. Here, the computer programs are configured by a combination of a plurality of instruction codes that indicate commands given to the computer in order to achieve predetermined functions.
(2) Some or all of the constituent elements of each device described above may be configured as single system large-scale integration (LSI). The system LSI is ultra-multifunctional LSI manufactured by integrating a plurality of components on a single chip, and specifically a computer system that includes, for example, a microprocessor, a ROM, and a RAM. The ROM stores computer programs. The system LSI achieves its functions as a result of the microprocessor operating in accordance with the computer programs.
(3) Some or all of the constituent elements of each device described above may be configured as an IC card or a stand-alone module that is detachable from the device. The IC card or the module may be a computer system that includes, for example, a microprocessor, a ROM, and a RAM. The IC card or the module may include the ultra-multifunctional LSI described above. The IC card or the module achieves its functions as a result of the microprocessor operating in accordance with the computer programs. The IC card or the module may have protection against tampering.
(4) The present disclosure may be implemented as the methods described above. The present disclosure may also be implemented as a computer program that realizes these methods via a computer or as digital signals generated by the computer programs.
(5) The present disclosure may also be implemented by recording the computer programs or the digital signals on a non-transitory computer-readable recording medium such as a flexible disk, a hard disk, a CD-ROM, an MO, a DVD, a DVD-ROM, a DVD-RAM, a Blu-ray (registered trademark) disc, or a semiconductor memory. The present disclosure may also be implemented as the aforementioned digital signals recorded on such a non-transitory recording medium.

The present disclosure may be implemented by transmitting the computer programs or the digital signals via, for example, telecommunication lines, wireless or wired communication lines, networks typified by the Internet, or data broadcasting.

The present disclosure may also be implemented as a computer system that includes a microprocessor and a memory and in which the memory stores the computer programs and the microprocessor operates in accordance with the computer programs.

The present disclosure may also be implemented as another independent computer system by transferring the programs or the digital signals recorded on the recording medium or by transferring the programs or the digital signals via the network or the like.

INDUSTRIAL APPLICABILITY

The present disclosure is usable as a data augmentation method for training data sets used in training of a neural network, a learning device, and a program. In particular, the present disclosure is usable in a data augmentation method, a learning device, and a program that are capable of both the training of the neural network and the optimization of hyperparameters for each sample while reducing the calculation cost.

The invention claimed is:

1. A data augmentation method for a training data set used in training of a neural network, the data augmentation method comprising:
alternately performing first optimization processing and second optimization processing, the first optimization processing being processing for optimizing a plurality of parameters of the neural network, the plurality of parameters including a weight, the second optimization processing being processing for optimizing a hyperparameter serving as a variable that prescribes data conversion processing for each sample used in data augmentation processing,
wherein the first optimization processing includes:
acquiring a first augmented sample by performing the data augmentation processing on a first sample included in the training data set;
causing the neural network to predict a first augmentation label from the first augmented sample;
calculating a first error function for evaluating an error between the first augmentation label and a first correct label that indicates a correct answer to the first sample included in the training data set; and
updating the plurality of parameters in accordance with the first error function calculated, and
the second optimization processing includes:
acquiring a second sample from an evaluation data set that is similar in distribution to a test data set for evaluating performance of the neural network;
causing the neural network after the updating of the plurality of parameters to predict a second label from the second sample;
calculating a second error function for evaluating an error between the second label and a second correct label that indicates a correct answer to the second sample included in the evaluation data set; and
updating the hyperparameter in accordance with a gradient obtained by partial differentiation of the second error function calculated, with respect to the hyperparameter.

2. The data augmentation method according to claim 1, wherein in the updating of the hyperparameter,
the hyperparameter is updated in accordance with the gradient to reduce a difference between distribution of the evaluation data set and distribution of a data-augmented training data set obtained by performing the data augmentation processing on the training data set.

3. The data augmentation method according to claim 1, wherein the hyperparameter is converted into an implicit function in a function indicating the data augmentation processing, and
the neural network is an exact differentiable function.

4. The data augmentation method according to claim 1, wherein, in the calculating of the first error function, the first error function is calculated to evaluate an error between the first augmentation label and a first correct soft label, using Kullback-Leibler divergence, the first correct soft label being obtained by converting a correct value indicated by the first correct label into a soft label.

5. The data augmentation method according to claim 1, wherein the calculating of the first error function further includes assigning a weight calculated for each sample to the first error function.

6. A learning device for performing a data augmentation method for a training data set used in training of a neural network, the learning device comprising:
- a processor; and
- a memory,
wherein the processor uses the memory to alternately perform first optimization processing and second optimization processing, the first optimization processing being processing for optimizing a plurality of parameters of the neural network, the plurality of parameters including a weight, the second optimization processing being processing for optimizing a hyperparameter serving as a variable that prescribes data conversion processing for each sample used in data augmentation processing, the first optimization processing includes:
- acquiring a first augmented sample by performing the data augmentation processing on a first sample included in the training data;
- causing the neural network to predict a first augmentation label from the first augmented sample;
- calculating a first error function for evaluating an error between the first augmentation label and a first correct label that indicates a correct answer to the first sample included in the training data set; and
- updating the plurality of parameters in accordance with the first error function calculated, and the second optimization processing includes:
- acquiring a second sample from an evaluation data set that is similar in distribution to a test data set for evaluating performance of the neural network;
- causing the neural network after the updating of the plurality of parameters to predict a second label from the second sample;
- calculating a second error function for evaluating an error between the second label and a second correct label that indicates a correct answer to the second sample included in the evaluation data set; and
- updating the hyperparameter in accordance with a gradient obtained by partial differentiation of the second error function calculated, with respect to the hyperparameter.

7. A non-transitory computer-readable recording medium having recorded thereon a program for causing a computer to execute a data augmentation method for a training data set used in training of a neural network, the data augmentation method comprising:

alternately performing first optimization processing and second optimization processing, the first optimization processing being processing for optimizing a plurality of parameters of the neural network, the plurality of parameters including a weight, the second optimization processing being processing for optimizing a hyperparameter serving as a variable that prescribes data conversion processing for each sample used in data augmentation processing, wherein the first optimization processing includes:
- acquiring a first augmented sample by performing the data augmentation processing on a first sample included in the training data set;
- causing the neural network to predict a first augmentation label from the first augmented sample;
- calculating a first error function for evaluating an error between the first augmentation label and a first correct label that indicates a correct answer to the first sample included in the training data set; and
- updating the plurality of parameters in accordance with the first error function calculated, and the second optimization processing includes:
- acquiring a second sample from an evaluation data set that is similar in distribution to a test data set for evaluating performance of the neural network;
- causing the neural network after the updating of the plurality of parameters to predict a second label from the second sample;
- calculating a second error function for evaluating an error between the second label and a second correct label that indicates a correct answer to the second sample included in the evaluation data set; and
- updating the hyperparameter in accordance with a gradient obtained by partial differentiation of the second error function calculated, with respect to the hyperparameter.

* * * * *